US010432269B2

(12) United States Patent
Viering et al.

(10) Patent No.: US 10,432,269 B2
(45) Date of Patent: Oct. 1, 2019

(54) CONNECTION FAILURE DETECTION IN WIRELESS NETWORK BASED ON COORDINATED MULTI-CELL COMMUNICATION TECHNIQUE

(71) Applicant: NOKIA SOLUTIONS AND NETWORKS OY, Espoo (FI)

(72) Inventors: Ingo Viering, Munich (DE); Lei Du, Beijing (CN); Yang Liu, Beijing (CN); Jarmo Tapani Mäkinen, Espoo (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/542,236

(22) PCT Filed: Mar. 23, 2015

(86) PCT No.: PCT/EP2015/056074
§ 371 (c)(1),
(2) Date: Jul. 11, 2017

(87) PCT Pub. No.: WO2016/150477
PCT Pub. Date: Sep. 29, 2016

(65) Prior Publication Data
US 2017/0373728 A1 Dec. 28, 2017

(51) Int. Cl.
H04B 7/024 (2017.01)
H04B 7/06 (2006.01)
(Continued)

(52) U.S. Cl.
CPC ........... H04B 7/024 (2013.01); H04B 7/0632 (2013.01); H04W 24/08 (2013.01); H04W 24/04 (2013.01)

(58) Field of Classification Search
CPC ..... H04B 7/024; H04B 7/0632; H04W 24/08; H04W 24/04
(Continued)

(56) References Cited

U.S. PATENT DOCUMENTS 9,577,738 B2 * 2/2017 Nilsson ................ H01Q 25/005
2010/0240359 A1 9/2010 Wu
(Continued)

FOREIGN PATENT DOCUMENTS

JP 2014220692 A 11/2014
WO 2014068535 A2 5/2014

OTHER PUBLICATIONS

International Search Report and Written Opinion for International Application No. PCT/EP2015/056074, dated Dec. 7, 2015, 13 pages.
(Continued)

Primary Examiner — Michael R Neff
(74) Attorney, Agent, or Firm — Brake Hughes Bellermann LLP

(57) ABSTRACT

An example technique is provided that includes establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique, and performing, by the user device, communication session failure detection for the multi-cell communication session taking into account signal gains provided by the coordinated multi-cell communication technique.

21 Claims, 8 Drawing Sheets

(51) Int. Cl.
*H04W 24/08* (2009.01)
*H04W 24/04* (2009.01)

(58) Field of Classification Search
USPC .......................................................... 375/267
See application file for complete search history.

(56) References Cited

U.S. PATENT DOCUMENTS

| | | |
|---|---|---|
| 2011/0194630 A1 | 8/2011 | Yang et al. |
| 2013/0003788 A1 | 1/2013 | Marinier et al. |
| 2014/0161056 A1 | 6/2014 | Mousley et al. |
| 2014/0220692 A1 | 8/2014 | Tohidi et al. |
| 2016/0080985 A1 | 3/2016 | Uchino et al. |
| 2016/0119825 A1* | 4/2016 | Uchino ................. H04B 7/024 370/332 |

OTHER PUBLICATIONS

Helka-Liina Määttänen et al. System-level performance of LTE-Advanced with joint transmission and dynamic point selection schemes; 2012.

3GPP TS 36.133 V12.5.0; 3rd Generation Partnership Project; Technical Specification Group Radio Access Network; Evolved Universal Terrestrial Radio Access (E-UTRA); Requirements for support of radio resource management (Release 12), Sep. 2014 (877 pages).

Hongliang Bian et al. An ICSGC Algorithm for Carrier Assignment in Downlink Coordinated Multi-Point with Carrier Aggregation; IEEE 2010; pp. 934-938.

ETSI TS 136 133 V12.5.0, Technical Specification, LTE; Evolved Universal Terrestrial Radio Access (E-UTRA); Requirements for support of radio resource management (3GPP TS 36.133 version 12.5.0 Release 12) Nov. 2014 (14 pages).

Rhode & Schwarz: White Paper 1MA232-1E, "LTE-Advanced (3GPP Rel.11) Technology Introduction" (39 pages).

Office Action for Japanese Application No. 2017-549709, dated Feb. 25, 2019, 2 pages.

* cited by examiner

CONNECTION FAILURE DETECTION IN WIRELESS NETWORK BASED ON COORDINATED MULTI-CELL COMMUNICATION TECHNIQUE

CROSS-REFERENCE TO RELATED APPLICATIONS

This application is a national stage entry of PCT Application No. PCT/EP2015/056074 filed Mar. 23, 2015, entitled "CONNECTION FAILURE DETECTION IN WIRELESS NETWORK BASED ON COORDINATED MULTI-CELL COMMUNICATION TECHNIQUE" which is hereby incorporated by reference in its entirety.

TECHNICAL FIELD

This description relates to wireless networks.

BACKGROUND

A communication system may be a facility that enables communication between two or more nodes or devices, such as fixed or mobile communication devices. Signals can be carried on wired or wireless carriers.

An example of a cellular communication system is an architecture that is being standardized by the 3$^{rd}$ Generation Partnership Project (3GPP). A recent development in this field is often referred to as the long-term evolution (LTE) of the Universal Mobile Telecommunications System (UMTS) radio-access technology. E-UTRA (evolved UMTS Terrestrial Radio Access) is the air interface of 3GPP's Long Term Evolution (LTE) upgrade path for mobile networks. In LTE, base stations, which are referred to as enhanced Node Bs (eNBs), provide wireless access within a coverage area or cell. In LTE, mobile devices, or mobile stations are referred to as a user equipment (UE). LTE has included a number of improvements or developments. 5G wireless networks are also being developed.

Dual Connectivity (DC) is a mode of operation in which a user equipment (UE) or mobile station is connected with two base stations/cells at different frequencies, such as a master eNB (or MeNB or master base station) and a secondary eNB (SeNB or secondary base station). Dual connectivity may have several advantages, such as, for example, reducing the number of handover failures and/or increasing a user's throughput. Similarly, for 5G wireless networks, multi-connectivity allows a UE or mobile station to be connected to multiple base stations or eNBs. In 5G multi-connectivity, the user device may be connected to multiple cells on the same frequency or on different frequencies.

SUMMARY

According to an example implementation, a method may include establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and performing, by the user device, communication session failure detection for the multi-cell communication session taking into account signal gains provided by the coordinated multi-cell communication technique.

According to an example implementation, an apparatus may include means for establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and means for performing, by the user device, communication session failure detection for the multi-cell communication session taking into account signal gains provided by the coordinated multi-cell communication technique.

An apparatus comprising at least one processor and at least one memory including computer instructions, when executed by the at least one processor, cause the apparatus to: establish a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and perform, by the user device, communication session failure detection for the multi-cell communication session taking into account signal gains provided by the coordinated multi-cell communication technique.

A computer program product may include a non-transitory computer-readable storage medium and storing executable code that, when executed by at least one data processing apparatus, is configured to cause the at least one data processing apparatus to perform a method including: establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and performing, by the user device, communication session failure detection for the multi-cell communication session taking into account signal gains provided by the coordinated multi-cell communication technique.

According to another example implementation, a method may include establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; measuring, by the user device, a characteristic of the received user device-specific coordinated multi-cell reference signal; and performing, by the user device, communication session failure detection for the multi-cell communication session based upon the characteristic of the received user device-specific coordinated multi-cell reference signal.

According to an example implementation, an apparatus may include means for establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; means for receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; means for measuring, by the user device, a characteristic of the received user device-specific coordinated multi-cell reference signal; and means for performing, by the user device, communication session failure detection for the multi-cell communication session based upon the characteristic of the received user device-specific coordinated multi-cell reference signal.

According to another example implementation, an apparatus may include at least one processor and at least one memory including computer instructions, when executed by the at least one processor, cause the apparatus to: establish a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; receive, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; and measure, by the user device, a characteristic of the received user device-specific coordinated multi-cell reference signal; and perform, by the user device, communication session failure detection for the multi-cell communication session based upon the characteristic of the received user device-specific coordinated multi-cell reference signal.

According to another example implementation, a computer program product may include a non-transitory computer-readable storage medium and storing executable code that, when executed by at least one data processing apparatus, is configured to cause the at least one data processing apparatus to perform a method including: establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; measuring, by the user device, a characteristic of the received user device-specific coordinated multi-cell reference signal; and performing, by the user device, communication session failure detection for the multi-cell communication session based upon the characteristic of the received user device-specific coordinated multi-cell reference signal.

The details of one or more implementations are set forth in the accompanying drawings and the description below. Other features will be apparent from the description and drawings, and from the claims.

DETAILED DESCRIPTION

Figure 1:
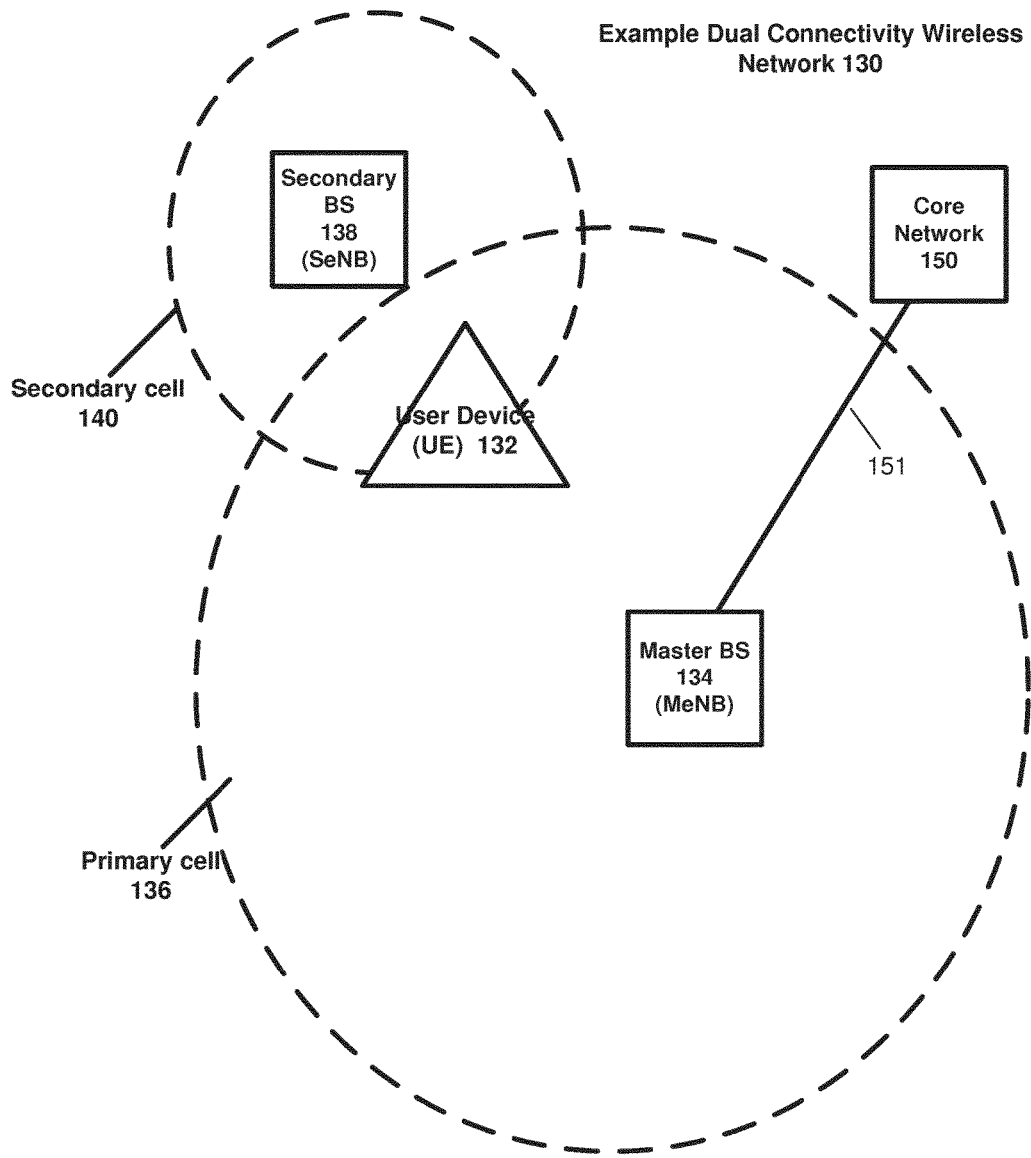
FIG. 1 is a block diagram of a dual connectivity wireless network according to an example implementation.

FIG. 1 is a block diagram of a dual connectivity wireless network. In the wireless network 130 of FIG. 1, a plurality of network nodes are shown. Referring to FIG. 1, a user device 132, which may also be referred to as a user equipment (UE), may be connected (and in communication) with multiple base stations (BSs), which may also be referred to as enhanced Node Bs (eNBs). Therefore, according to an example implementation, a network node may include (or may be) a user device or UE, and/or a BS or eNB. At least part of the functionalities of a base station or (e)Node B (eNB) may be also be carried out by any node, server or host which may be operably coupled to a transceiver, such as a remote radio head.

Referring to FIG. 1, user device (or UE) 132 may be connected (and in communication) with a master BS 134 (or master eNB or MeNB) which provides wireless coverage within a master cell group (MCG), which may include one or more cells associated with master BS 134, such as primary cell (Pcell) 136. The user device 132 may also be simultaneously connected to and/or in communication with one or more secondary BSs, such as to a secondary BS 138 (also referred to as secondary BS or SeNB), which provides wireless coverage within a secondary cell group (SCG), which may include one or more secondary cells (Scells), such as Scell 140, associated with secondary BS 138.

Thus a wireless connection may be established between a user device and a BS. Establishing a wireless connection may include, for example, the user device obtaining information that may be necessary for the user device to communicate with the BS. In an illustrative example implementation, as part of establishing a wireless connection with a BS, a user device may obtain a terminal/UE identity (such as a cell radio network temporary identifier or C-RNTI of the UE) for the user device and uplink synchronization information from the BS to allow the user device to communicate with the BS. Also, as part of establishing a wireless connection, resources for the wireless connection may be allocated by the user device and/or BS to allow communication to occur between the user device and BS, and/or context (or context information) for the wireless connection may be stored by the user device and/or the BS.

According to one illustrative (and non-limiting) example implementation, a user device may establish a connection with a BS by performing a random access procedure with the BS via a random access channel (RACH), which may be referred to as a RACH procedure, for example. As part of an example RACH procedure, a user device may send a random access preamble to the BS to allow the BS to estimate transmission timing for the user device. The BS may then send a user device/UE identity (e.g., C-RNTI) for the user device to use in communicating with the BS or cell, and a timing advance offset (synchronization information) to allow the user device to transmit uplink signals to the BS. In one example implementation, by performing random access, the user device may transition from an idle (e.g., an RRC_idle) state with respect to the BS, to a connected (e.g., RRC_connected) state with respect to the BS, where RRC refers to radio resource control. Also, RACH-less procedures may also be used to establish a connection between a user device and a BS, e.g., such as where the user device already has synchronization information or timing advance offset information for a cell or BS. A random access procedure is merely one illustrative example of a technique that may be used to establish a connection between a user device and a BS, and other techniques or procedures may be used to establish a connection. Also, a user device may be connected with a plurality of (or multiple) cells or BSs at the same time. A connection may use one or more wireless links to communicate data between a user device and a BS.

Thus, with reference to FIG. 1, in an illustrative example implementation, user device 132 may receive wireless services via one or more cells (e.g., including a primary cell and possibly one or more secondary cells) of a master cell group (MCG) associated with the master BS (or MeNB) 134, and via one or more secondary cells or Scells (e.g., including at least a primary secondary cell or Pscell) associated with the secondary BS 138 (or SeNB). Thus, the example network nodes shown in FIG. 1 include a SeNB 138, a MeNB 134 and a user device 132. BS 134 is also connected to a core network 150 via a S1 interface 151. BS 138 may also be connected to core network 150. Secondary BS 138 may be connected via an interface to master BS 134. This is merely an example of a wireless network, and others may be used.

According to an example implementation, a user device (user terminal, user equipment (UE)) may refer to a portable computing device that includes wireless mobile communication devices operating with or without a subscriber identification module (SIM), including, but not limited to, the following types of devices: a mobile station (MS), a mobile phone, a cell phone, a smartphone, a personal digital assistant (PDA), a handset, a device using a wireless modem (alarm or measurement device, etc.), a laptop and/or touch screen computer, a tablet, a phablet, a game console, a notebook, and a multimedia device, as examples. It should be appreciated that a user device may also be a nearly exclusive uplink only device, of which an example is a camera or video camera loading images or video clips to a network.

In LTE (as an example), the core network 150 may be referred to as Evolved Packet Core (EPC), which may include a mobility management entity (MME) which may handle or assist with mobility/handover of user devices between BSs, one or more gateways that may forward data and control signals between the BSs and packet data networks or the Internet, and other control functions or blocks. While LTE is mentioned as one illustrative example, the various implementations are applicable to a wide variety of networks, including 5G wireless networks.

Therefore, according to one example implementation, a dual connectivity wireless network allows for a user device (such as user device 132) to be simultaneously connected to multiple base stations, e.g., simultaneously connected to both a master BS (or MeNB) 134, and a secondary BS (SeNB) 138 (or to one or more SeNBs). A dual connectivity wireless network, such as the network 130 shown in FIG. 1 may have several advantages, such as, for example, decreasing a signaling load towards the core network, sharing traffic/packet processing among multiple base stations, as well as benefiting from flexible resource usage where one or more carriers may be used on a radio link between the MS and each BS, e.g., inter-site carrier aggregation.

Figure 2:
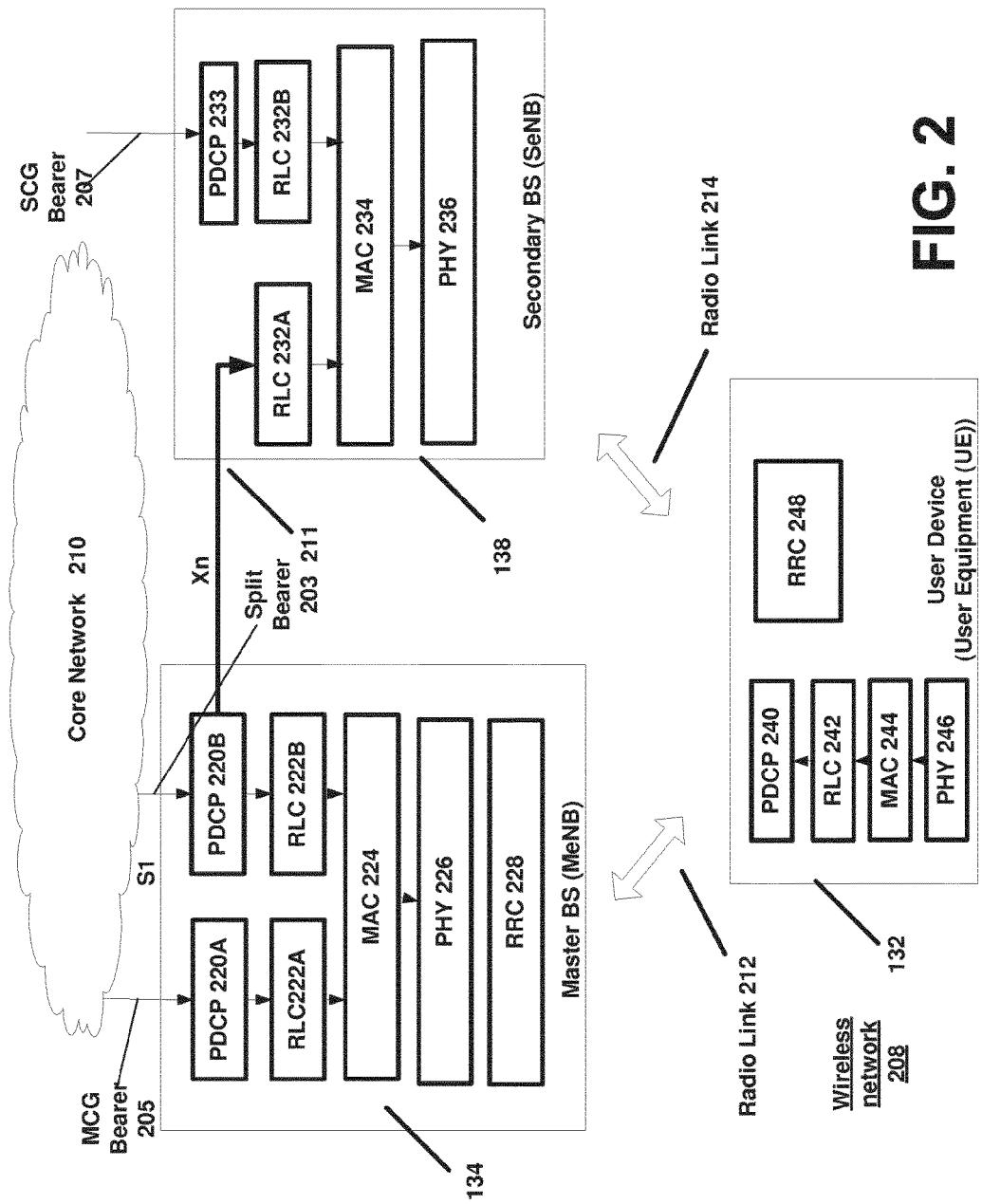
FIG. 2 is a block diagram illustrating a dual connectivity wireless network in more detail according to an example implementation.

Similarly, 5G multi-connectivity may allow a user device (or UE) to be connected to one or more BSs or eNBs/cells. According to an example implementation of multi-connectivity, there is not necessarily a master BS and a secondary/slave BS, but rather, only multiple BSs/cells to which the user device may be connected. Thus, in 5G multi-connectivity, the user device may be connected to a set (or active set) of BSs/cells. FIG. 2 is a block diagram illustrating a dual connectivity wireless network 208 in more detail according to an example implementation. Although not shown, each base station (BS) and the user device (or UE) 132 includes a processor, memory and one or more wireless transceivers (wireless transmitter/receiver). Master BS 134 (or MeNB) and secondary BS 138 (or SeNB) may be connected via a bidirectional backhaul connection (which may be wired or wireless), which is shown in FIG. 2 as an Xn interface 211. One or both of BSs 134, 138 may be connected to the core network 210 via a bidirectional S1 interface. A user device 132 may, for example, be simultaneously connected to master BS 134 via a radio link 212 and to secondary BS 138 via a radio link 214.

User device 132, BS 134 and BS 138 each includes at least one radio protocol stack that may be implemented in hardware and/or software. According to an example implementation, a protocol stack may include logic, and/or computer instructions executed by a processor to perform the functions or operations for each entity of the protocol stack. An example protocol stack for the master BS 134 may include, for example, at least a Packet Data Convergence Protocol (PDCP) entity 220A, a Radio Link Control (RLC) entity 222A, a Media Access Control (MAC) entity 224, a Physical layer (PHY) entity 226, and a Radio Resource Control (RRC) entity 228.

The PDCP entity 220A performs ciphering (encryption and decryption of data) and header compression-decompression. There is one PDCP entity 222A per radio bearer configured for a user device. The RLC entity 222A performs segmentation/concatenation, error detection and correction, data retransmission, duplicate detection and in-sequence data delivery to higher layers. According to an example implementation, there may be one RLC entity per radio bearer or multiple RLC entities per radio bearer configured for a user device. According to one example implementation, the radio protocol stack may include two RLC entities per radio bearer. MAC entity 224 performs multiplexing of logical channels (where there may be one or more logical channel per radio bearer), hybrid ARQ retransmissions, inserting of MAC control elements (MAC CEs) used for in-band control signaling, and other MAC-related functions. The BS MAC entity 224 also performs uplink and downlink scheduling (located in MAC entity of each BS). The MAC entity 224 provides services to the RLC entities in the form of logical channels. The PHY entity 226 handles or performs coding/decoding, modulation/demodulation, multi-antenna mapping, and other physical layer functions. Multiple RLC entities within a BS may, for example, share one MAC entity 224 and one PHY entity 226.

RRC entity 228 is responsible for handling a number of functions or procedures related to the Radio Access Network (RAN) (e.g., shown in FIGS. 1-2), including broadcast of system information necessary for the user device to be able to communicate with a cell or BS, transmission of paging messages originating from the core network 210 to notify a user device about incoming connection requests, connection management including setting up bearers and mobility, mobility functions such as change of servings cells and handover, and other control related functions. According to an illustrative example implementation, the RRC entity may be provided in a master BS and a user device, but may not be (necessarily) provided (or operating) in a secondary BS (SeNB), for example.

As shown in FIG. 2, secondary BS 138 may include at least one protocol stack that includes protocol entities that are the same or similar to those of master BS 134. For example, secondary BS 138 (SeNB) may include a RLC entity 232A (e.g., receiving data associated with a split bearer 203), a MAC entity 234, and a PHY entity 236. BS 138 may also include, for example, PDCP entity 233 and RLC entity 232B (e.g., receiving data for a SCG bearer 207). According to an example implementation, MAC entity 234 and PHY entity 236 may be shared by multiple RLC entities of secondary BS (RLC entities 232A and 232B).

User device 132 includes protocol entities that communicate with the peer entities at the master BS 134 and/or secondary BS 138. While only one protocol stack (e.g., RRC, PDCP, RLC, MAC and PHY) is shown for the user device 132, it should be understood that user device 132 may include at least one protocol stack (or portion thereof) for communicating with master BS 134 and at least one protocol stack (or portion thereof) for communicating with secondary BS 138, according to an example implementation, e.g., one PDCP entity and one RLC entity at user device 132 for each peer entity at master BS 134 or secondary BS 138. Therefore, user device 132 may include the following example protocol entities: PDCP entity 240, RLC entity 242, MAC entity 244, PHY entity 246 and RRC entity 248. These protocol entities at user device 132 may, for example, perform the same or very similar functions as performed by the peer protocol entities of the master BS 134 or secondary BS 138, and/or communicate with the peer entities at one or more BSs.

According to an example implementation, the Radio Access Network (RAN), which includes a group of BSs or eNBs, provides one or more radio bearers. A radio bearer generally provides a transport service between two points. For example, packets may be mapped to bearers according to their QoS (quality of service) requirements and the destination (IP address or MS) of the packets.

Several different bearer types may be used. A first type of bearer is a master cell group (MCG) bearer in which data or traffic for the MCG bearer is handled or processed by a master cell group (MCG) and an associated master BS 134. MCG may include one or more cells controlled by the master BS, such as at least a Pcell (primary cell). A second type of a bearer is a secondary cell group (SCG) bearer, such as, for example, SCG bearer 207, in which data or traffic are processed and forwarded to a mobile station from the secondary BS (or SeNB) 138 via PDCP entity 233 and RLC entity 232B. Thus, for example, data for the SCG bearer 207 may be processed or forwarded via the one or more cells of the secondary cell group (SCG). A third type of bearer is a split bearer, such as split bearer 203, in which data for the split bearer may be split or divided between base stations for forwarding. For example, for split bearer 203, the PDCP entity 220B (receiving data for the split bearer 203) of master BS 134 may split the data or traffic associated with bearer 203 between RLC entity 222B at master BS 134 and RLC entity 232A at secondary BS (SeNB) 138. Thus, in the example of a split bearer, the PDCP entity 220B may split traffic between RLC entities of the master BS 134 and the secondary BS 138, e.g., to allow offloading of some traffic to the secondary BS 138.

In dual connectivity, at least one cell (e.g., a Pcell) of the master cell group (MCG) serves the user device 132 via the master BS 134 (MeNB), and at least one cell (e.g., a Scell, and/or or Pscell) of the secondary cell group (SCG) serves the user device 132 via the secondary BS 138 (SeNB). However, in 5G wireless networks, a user device may also be served by multiple cells (or multiple BSs/eNBs). In 5G, there may or may not be a primary cell (PCell) or secondary cell (SCell) designation for each cell that is connected to a user device, depending on the example implementation of the 5G wireless network.

According to an example implementation, one or more coordinated multi-cell communication techniques may be used for a set (or plurality) of cells to communicate with the user device, e.g., to send (or transmit) signals to or receive signals from the user device. According to an example implementation, a coordinated multi-cell communication technique may include a communication technique in which multiple cells operate in a coordinated manner to transmit signals to and/or receive signals from a user device. In an illustrative example implementation, a coordinated manner of transmitting may include cells transmitting jointly (or concurrently) to the user device, or where any subset (e.g., one) of the cells may be selected for transmission to the user device, or other technique in which there is a coordination among the set of cells. Thus, the coordination may include, by way of example, cells transmitting at the same time and/or via the same time/frequency resources to the user device, or one cell (e.g., a best or strongest cell) of the set of cells transmitting to the user device while the other cells do not transmit, and then a different cell of the set of cells transmitting to the user device if the best/strongest cells has changed. In another illustrative example, coordination among cells may also include one or more of the cells transmitting coherently using beamforming weights for each cell to transmit a signal to the user device.

In an example implementation, a coordinated multi-cell communication technique may be used to provide signal gains (for example, increased or improved received signal quality and/or improved received signal strength/power) at the user device, as compared to a cell transmitting without using coordinated multi-cell communication technique. Coordinated multi-cell communication techniques may also include, for example, coordinated multipoint (CoMP) transmission/reception, or variations thereof, which may include, for example, schemes or techniques where transmission is carried out from one transmission point or cell but where the scheduling and link adaptation may be coordinated between cells or transmission points, and schemes or techniques where transmission to a user device may be carried out from different cells or transmission points, and schemes or techniques that may switch between different schemes or communication techniques. These example coordinated multi-cell communication techniques are described by way of example and others may be used.

Some example coordinated multi-cell communication techniques may include (as illustrative example implementations) a fast cell selection (FCS) technique, a non-coherent joint transmission technique, and a coherent joint transmission technique. One or more of these techniques may include cells (or one or more cells) transmitting (or configured to transmit) on a same frequency layer to communicate with the user device. A same frequency layer may include, for example, a same frequency (e.g., same carrier frequency), or same/common set of frequency resources (e.g., such as a group of subcarriers or physical resource blocks/PRBs) that may be used by an active set of cells that are connected to the user device.

In the fast cell selection (FCS) technique, a best cell (e.g., a cell having a best signal quality or highest received signal strength as received/measured by the user device and reported to the cells and core network) out of a set of cells connected to the user device is selected for communication with (e.g., transmitting signals to or receiving signals from) the user device. In FCS, the network or the user device may select the cell to be used for communication out of the set of cells, and this best cell may change over time, and may even change each time there is a communication between the user device and the set of cells. Thus, in this example implementation, signals gains (e.g., improved signal power/strength and/or signal quality as measured/received by the user device) may be obtained by the user device based on the best cell from the set of cells being selected and used for communication with the user device.

In coherent joint transmission, multiple cells/transmission points may concurrently transmit a same signal to the user device, and each cell/transmission point may apply transmission weights or beamforming weights to the transmitted signals to improve the signal as received by the user device. According to an illustrative example implementation of a coherent joint transmission technique, the core network and/or BSs/eNBs, or other nodes may determine or calculate transmission weights or beamforming weights for each cell of the set of cells based on received channel information for each channel between a cell and the user device. Thus, signal gains may be obtained by the user device based on both concurrent transmission of a signal from multiple cells/transmission points and from the use of the transmission (or beamforming) weights by each cell/transmission point.

In a non-coherent joint transmission technique, multiple cells/transmission points concurrently transmit a same signal to the user device without applying specific transmission (or beamforming) weights to each cell or transmission point. Therefore, according to an example implementation of non-coherent joint transmission, signal gains (e.g., improved received signal strength and/or signal quality) may be obtained by the user device based on the joint or concurrent transmission of a signal from multiple cells.

In one illustrative example implementation, a cell may be provided by each of a plurality of remote radio heads (RRHs), where each remote radio head may transmit and receive signals received from a common base station hotel. For example, a group of remote radio heads may be connected to a base station hotel via fiber optic link. Therefore, in the case of a group of RRHs connected to a common base station hotel, these RRHs may be part of an active set of cells that may jointly or concurrently transmit the same data or control signal to a user device, or where the BS hotel may coordinate the transmission of data/signal by a best/strongest of the cells/RRHs to the user device, for example.

According to an example implementation, data may be transmitted to a user device via a data channel, and a scheduling grant may be transmitted to a user device via a grant channel. An example of a data channel may include a physical downlink shared data channel (PDSCH), while an example of a grant channel may include a physical downlink control channel (PDCCH). A scheduling grant may be sent to a user device via the grant channel, and the scheduling grant may include information describing the scheduling grant, such as, for example, the subcarriers and/or time/frequency resources that have been allocated for the grant to the user device (either uplink grant or downlink grant).

Also, according to an example implementation, data and/or control signals (e.g., the scheduling grant) may be transmitted using a coordinated multi-cell communication technique, such as FCS, or joint transmission, as examples. Therefore, according to an example implementation, the scheduling grants (transmitted via the grant channel) and/or the data (transmitted via the data channel) transmitted to (and received by) the user device may have a coordinated multi-cell signal gain. That is, for example, the scheduling grant received by the user device via the grant channel and data received by the user device via the data channel may include signal gains (e.g., increased/improved signal strength and/or signal quality) due to the coordinated multi-cell communication technique used to transmit such control signals and/or data.

Connection (or link) failure detection may sometimes be used to determine when to terminate an existing connection, and/or when to establish a new connection. With the use of a coordinated multi-cell communication technique, an active set of cells may be identified for the user device, where the user device is connected to each cell in the active set of cells. The active set of cells may then be used to perform the coordinated multi-cell communication technique to communicate with the user device. For example, a best cell (e.g., having a greatest received signal strength at the user device) out of the active set of cells may be selected for transmitting to and/or receiving from the user device, or all of the cells of the active set may jointly (concurrently) transmit the same data or signal to the user device. In this manner, a multi-cell communication session may be established between a user device, where the multi-cell communication session includes a plurality of wireless connections that include a wireless connection between the user device and each of a plurality of cells in a same frequency layer. The multi-cell communication session between the user device and the active set of cells may send and/or receive data using a coordinated multi-cell communication technique.

According to an example implementation, for multi-cell communications (e.g., which may, at least in some cases, employ a coordinated multi-cell communication technique), measurement reports from a user device to each cell (or one or more cells of the active set) may be used by the core network or other node to update the active set of cells for the user device. A user device may frequently or periodically measure one or more characteristics (e.g., signal quality such as SINR or an error rate, a received signal strength, or other signal characteristic/signal performance indication) of signals received from each cell, and then may send measurement reports to the cell or cells of the active set. Measurement reports for each cell may be sent by the user device and may report a measured characteristic(s) of signals received by the user device from the cell, such as a measured signal quality (e.g., SINR or error rate) and/or a measured signal strength of a received signal, for example. These measurement reports (or measured characteristics provided within the report) may be forwarded by a cell to a core network or other node where an active set of cells may be updated, e.g., the core network may make a decision to add or drop a cell (or connection or link) from the active set for the user device based on the measurement report(s), and then notify the user device to add or drop a connection or link from its active set of cells.

According to an example implementation, if a measurement report indicates a signal quality or signal strength for a cell that is below a first threshold, the network may typically remove or drop that cell (or connection or link) from the active set of cells for that user device. Similarly, if a measurement report indicates a signal quality or signal strength for a cell that is greater than a second threshold (e.g., a signal strength greater than 6 dB below the strongest cell of the active set), the network may typically add that cell to the active set of cells for the user device.

As noted, according to an example implementation, a multi-cell communication session may include a wireless connection to each of a plurality of cells of the active set of cells. A problem exists as to how communication session failure detection should be performed, e.g., in what manner should the user device determine a failure of the multi-cell communication session. This failure of the multi-cell communication session may refer to a condition of the communication session in which signals and/or data cannot be (e.g., reliably) transmitted or received, and new connections cannot or should not be added to the communication session, and the communication session should be terminated. An issue may arise as to which channel(s) and/or which signal(s) should be measured by the user device in order to perform communication session failure detection. As noted, a connection or cell which degrades may typically be dropped from the active set of cells for the user device (e.g., the connection or cell may be dropped from the communication session). According to one example implementation, a user device may measure a characteristic (e.g., signal strength or signal quality) of data received via a data channel (e.g., via a physical downlink shared data channel/PDSCH). In the case where data is transmitted to a user device from an active set of cells using a coordinated multi-cell communication technique, the measured characteristic (e.g., signal strength and/or signal quality) of the data received by the user device may typically include coordinated multi-cell signal gains, e.g., an increase in signal strength and/or signal quality of the received data/signals due to the transmission of the data using a coordinated multi-cell communication technique. Therefore, a multi-cell communication session failure detection may be performed based on the received data that were transmitted using a coordinated multi-cell communication technique since the received data include the coordinated multi-cell signal gains (e.g., due to a best cell transmitting the data via a FCS technique, or due to all/ multiple cells of the active set jointly transmitting the data). For example, the user device may measure a characteristic of the received data, and if the measured characteristic for the received data/signal is less than a threshold, and/or the user device may terminate the existing connections of the multi-cell communication session and sets up one or more new wireless connections for a new multi-cell communication session. Or the user device may determine whether it can receive control signals and/or data from the active set of cells based on the measured characteristic of the received data (which may include the coordinated multi-cell gain).

However, there may be very limited periods during which data is transmitted to the user device, e.g., only when the user device is scheduled for downlink transmission via the coordinated multi-cell communication technique. During other periods of time, when the user device is not scheduled, any data received/measured by the user device will be transmitted to another user device, and therefore may be transmitted using a coordinated multi-cell communication technique that is configured for the other user device, e.g., where the other user device may generally have a different best cell and/or a different active set of cells, different beamforming weights for each cell, etc., as compared to the current user device that is performing connection failure detection. Therefore, the measured characteristic of data received during an unscheduled period (when the user device is not scheduled) will not typically fully reflect the signal gains that the user device would typically receive during a data or signal transmission to the user device based on the coordinated multi-cell communication technique. As a result of this mis-match (the discrepancy or mis-match between signal characteristic of received data during unscheduled periods as compared to signal characteristic of received data during a scheduled period for the user device), it is likely that, at least in some cases, the user device may falsely detect a connection/link failure for the active set of cells if the user device uses data received during non-scheduled periods to measure a signal characteristic for performing connection failure detection. That is, according to an example implementation, the user device may falsely detect a connection failure based on measurement of unscheduled data, because the signal gains of scheduled data may be better/greater than any signal gains for unscheduled data, at least in some cases or in a typical case.

The same mis-match may also occur when measuring a scheduling grant that may be transmitted to another user device. Therefore, according to another example implementation, scheduling grants (or grant information) transmitted to the user device via a grant channel (e.g., PDCCH) may be transmitted using a coordinated multi-cell communication technique. In such a case, the grant channel may be referred to as a coordinated grant channel. Therefore, in such a case, the user device may similarly perform a multi-cell communication session failure detection based on a measured characteristic of the grant channel/grant information if the grant information transmitted to the user device via the grant channel is transmitted to the user device using a coordinated multi-cell communication technique, since such grant information will reflect approximately the coordinated multi-cell signal gains that the user device would experience on the coordinated data channel and/or coordinated grant channel, for example. However, for performing multi-cell communication session failure detection, this arrangement may limit the periods during which measurement of signal characteristics of the coordinated grant channel may be used to accurately detect a connection failure to those periods during which the grant information is scheduled/transmitted to the user device. Otherwise, during non-scheduled periods, the user device may receive and measure signals transmitted via the grant channel that was transmitted to other user devices, for example, which may result in a mis-match in signal gains, which may lead to a false detection of a communication session failure.

In some example implementations, grant information or other control signals may be broadcasted or transmitted to the user device without the use of a coordinated multi-cell communication technique. In such a case, the received control signals or grant information would not typically include or reflect any coordinated multi-cell signal gains.

Therefore, according to an example implementation, various techniques are described for performing, by a user device, a (multi-cell) communication failure detection taking into account signal gains provided by a coordinated multi-cell communication technique. In an example implementation, communication session failure detection may be performed by producing an estimate of a performance of a coordinated multi-cell communication session between a plurality of cells (of an active set of cells) and the user device based on measurement of signals from one or more individual cells of the plurality of cells. In this manner, by determining an estimate of a signal performance of a coordinated multi-cell communication session between an active set of cells and a user device based on a measurement of one or more signals from individual cells of the active set, this may allow the user device to more accurately perform communication session failure detection (e.g., which takes into account coordinated multi-cell signal gains) even when the user device is not receiving/scheduled to receive coordinated multi-cell data or grant signals.

Figure 3:
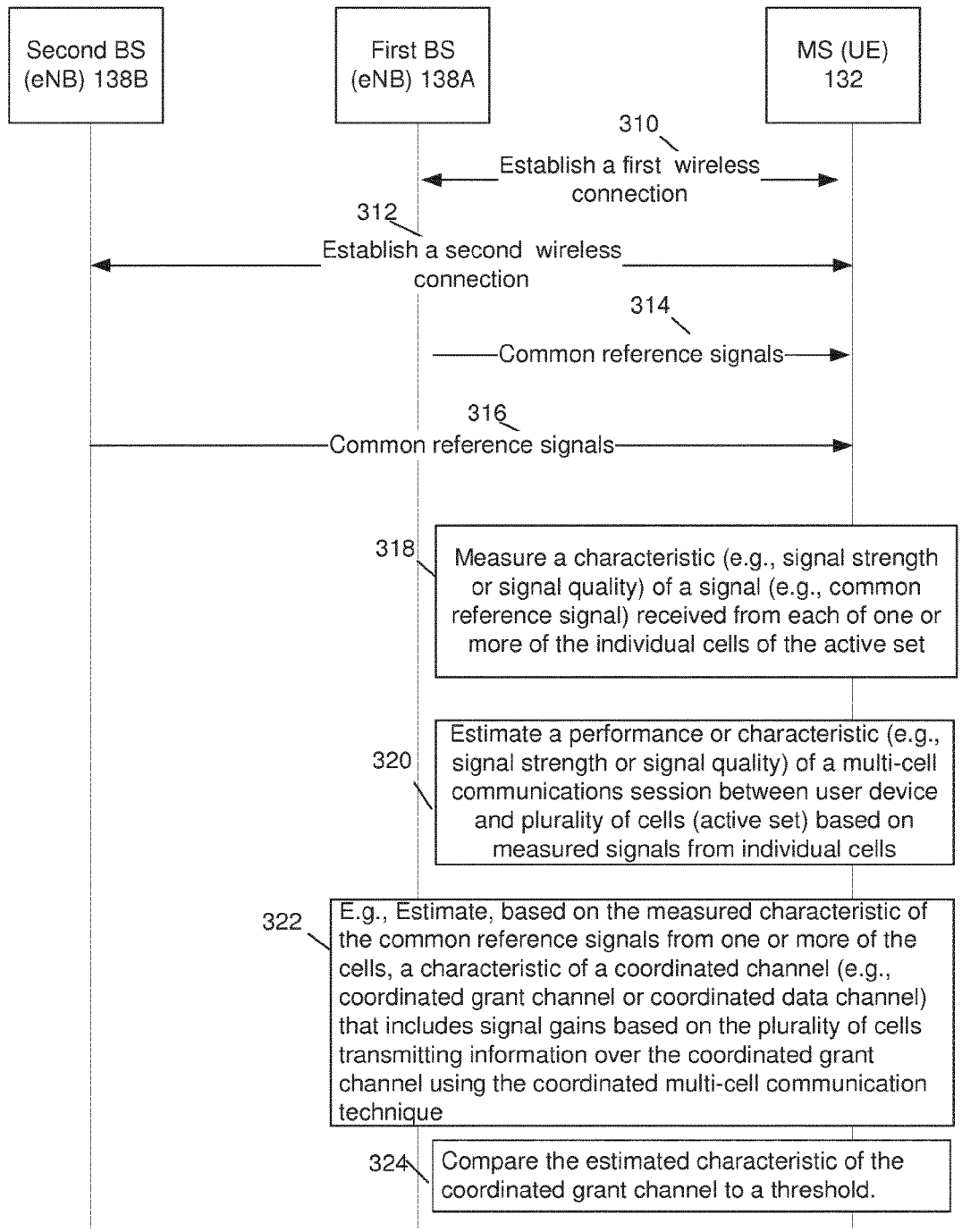
FIG. 3 is a diagram illustrating operation of a user device where the user device performs multi-cell communication session failure detection taking into account signal gains provided by a coordinated multi-cell communication technique according to an example implementation.

FIG. 3 is a diagram illustrating operation of a user device where the user device performs multi-cell communication session failure detection taking into account signal gains provided by a coordinated multi-cell communication technique according to an example implementation. In FIG. 3, a multi-cell communication session may be established between a user device (or UE) 132 and a plurality of cells. The communication session may include a plurality of wireless connections (or radio links), including a wireless connection (or radio link) between the user device 132 and each of a plurality of cells (e.g., including cells provided by BSs 138A, 138B). Therefore, as part of the communication session, the user device 132 may be connected to a plurality of cells. In an illustrative example implementation, a first BS 138A and a second BS 138B may provide wireless services for a first cell and a second cell, respectively. For example, at 310, the user device 132 may establish a first connection with BS 138A/first cell. At 312, user device 132 may establish a connection with BS 138B/second cell. Thus, in this illustrative example, an active set of cells for user device 132 may include only two cells/two BSs. However, an active set of cells for a user device may include any number of cells/BSs, for example.

At 314 and 316, user device 132 may receive signals (such, as for example, common reference signals, or cell-specific reference signals) from each of the cells/BSs that the user device is connected to. For example, at 314, user device 132 may receive common reference signals from BS 138A/first cell. At 316, user device 132 may receive common reference signals from BS 138B/second cell.

At 318, user device 132 measures a characteristic of a signal(s) (e.g., common reference signals) received from each of one or more of the individual cells of the active set of cells for the user device. Example signal characteristics that may be measured at 318 by the user device 132 may include, for example, a signal quality (e.g., signal-to-interference-plus-noise ratio (SINR), error rate, block error rate), signal strength, or other signal quality characteristic/signal performance indication. These are merely some illustrative example characteristics, and other signal characteristics may be measured.

At 320, the user device may estimate a performance or signal characteristic (e.g., estimated received signal strength or estimated signal quality) of a coordinated multi-cell communications session between the user device 132 and a plurality of cells (or active set of cells) based on measured signals from one or more individual cells (e.g., based on measured signals from one or more individual cells that are members of the active set of cells for the user device).

An illustrative example of operation 320 is shown as operation 322. According to an illustrative example implementation, at 322, the user device 132 may estimate, based on the measured characteristic of the common reference signals from one or more of the individual cells, a characteristic of a coordinated channel (e.g., a coordinated grant channel or a coordinated data channel) that includes signal gains based on the transmission of information (e.g., data and/or grant information or other signals) using the coordinated multi-cell communications technique. The transmission of information using the coordinated multi-cell communications technique may include, by way of example, a transmission to the user device 132 by/from a best cell of the active set of cells (e.g., FCS technique), or a joint transmission (either coherent or non-coherent) to the user device by/from the plurality of cells of the active set of cells. For example, a data channel over which a coordinated multi-cell data signal is transmitted may be referred to as a coordinated data channel. Similarly, a control channel over which a coordinated multi-cell transmission of signals may be referred to as a coordinated control channel. For example, a grant channel over which a coordinated multi-cell scheduling grant is transmitted may be referred to as a coordinated grant channel, e.g., since the coordinated grant channel may include transmission(s) from one or more of the cells/BSs of the active set of cells and provides/includes signal gains (e.g., increased signal quality and/or increased signal strength) based on the use of a coordinated multi-cell communications technique, e.g., FCS, joint transmission or other coordinated multi-cell communications technique.

According to an illustrative example implementation, a signal strength may be measured for a signal (e.g., common reference signals) received from each cell of the active set of cells. According to an example implementation, an estimate of a coordinated channel (e.g., coordinated grant channel or coordinated data channel) may be determined or calculated as a sum of signal strengths of the signals from each of the cells of the set of active cells divided by the interference created by cells which are not in the active set. For example, if there are three cells in an active set, and non-coherent joint transmission is used as a coordinated multi-cell communication technique, then the estimated signal strength of the coordinated channel may be determined, for example, as follows:

Est. signal strength of coordinated channel=SS1+SS2+SS3, where SS1, SS2 and SS3 refer to the measured signal strength of common reference signals received from cell 1, cell 2 and cell 3, respectively. The estimate of the coordinated channel=(SS1+SS2+SS3)/I_others, where I_others is the interference created by cells which are not in the active set. In another example implementation, SINR of a signal (e.g., common reference signals) may be summed or added together to obtain an estimated SINR of a coordinated channel if joint transmission is used. In addition, if coherent joint transmission is used as the coordinated multi-cell communication technique is used, then a beamforming offset value (e.g., 2 dB) may be added to the sum as follows:

Est. signal strength of coordinated channel=(SS1+SS2+SS3+BF_Offset)/I, where I is the interference created by cells that are not in the active set, and BF_Offset refers to an expected/approximate additional signal gain obtained at the user device/receiver based on the transmitting cells using beamforming weights.

In an similar manner, in another illustrative example implementation, a SINR may be measured for a signal (e.g., common reference signals) received from each cell of the active set of cells. According to an example implementation, FCS (Fast Cell Selection) may be used where a best cell (e.g., having a greatest signal quality) may be selected for transmission to the user device. Therefore, in this example where FCS is used as the coordinated multi-cell communication technique, the user device may determine the SINR of the common reference signal from each cell in the active set, and then the user device may determine the estimated SINR of a coordinated channel (e.g., coordinated grant channel or coordinated data channel) as the SINR of the best cell in the active set, e.g., the cell having the greatest/highest signal quality.

These are merely a few illustrative examples of techniques that may be used to determine an estimate of a characteristic of a coordinated channel based on a measured characteristic of signals received from individual cells. In this manner, the user device may obtain an estimated characteristic of a coordinated channel even when the user device is not scheduled to receive data or grant information, for example.

At 324, the user device 132 may then compare the estimated characteristic of the coordinated channel (e.g., of the coordinated grant channel or the coordinated data channel) to a threshold. For example, if the estimated characteristic of the coordinated channel is greater than a first threshold, then this may indicate that the coordinated channel is estimated to have an adequate signal strength and/or signal quality that the user device would be expected to be able to receive the information on the coordinated channel. In such case, the user device may proceed to receive (receive and decode) the information (data or control signals) on the coordinated channel.

However, if the estimated characteristic (e.g., estimated signal strength or estimated signal quality) of the coordinated channel is less than a second threshold, then this may indicate that the coordinated channel is estimated to have an inadequate signal strength and/or signal quality for the user device to receive the information on the coordinated channel (which may be considered a communication session failure). According to an example implementation, if the estimated characteristic of the coordinated channel is inadequate, the user device may for example, not proceed to receive and/or attempt to decode the coordinated signal in this case, and the user device may terminate the communication session (including terminating each of the connections of the communication session). In such a case, with the current communication session terminated, the user device may begin establishing a new multi-cell communication session. Alternatively, the user device may simply drop one (or more) of the connections from the communication session in response to detecting the communication session failure.

According to one example implementation, user device 132 may measure a signal-to-interference-plus-noise ratio (SINR) of common reference signals received from one or more of the cells of the active set of cells for the user device, e.g., when scheduling grant information is not transmitted to the user device via the coordinated grant channel. As noted, the coordinated grant channel may include a grant channel that includes signal gains based on the active set of cells transmitting a scheduling grant(s) over the grant channel to the user device using a coordinated multi-cell communication technique (e.g., FCS or JT). These common reference signals (or other signals) may be received and measured by the user device either when the user device is receiving/scheduled to receive a scheduling grant over a grant channel (e.g., PDCCH) and/or when the user device is receiving or scheduled to receive data over a data channel (e.g., PDSCCH). Or, the common reference signals (or other signals) may be received from each cell of the active set and measured by the user device even when the user device is not receiving/is not scheduled to receive grant information over a grant channel or data over a data channel.

According to an example implementation, after the SINR of common reference signals from each cell of the active set has been measured, the user device may estimate, based on the one or more measured SINRs of common reference signals from individual cells, a block error rate (BLER) of the coordinated grant channel that include signal gains based on the plurality of cells transmitting information over the coordinated grant channel using the coordinated multi-cell communication technique.

According to an example implementation, a user device may use a measured characteristic of a coordinated channel (actually measuring the coordinated data channel or coordinated grant channel, e.g., when user device is scheduled and the coordinated channel reflects signal gains from the coordinated multi-cell communication technique) and then use this actual measurement of the coordinated channel to verify the accuracy of and/or adjust the estimated characteristic of the coordinated channel. For example, the user device may: 1) compare the measured (actually measured, not estimated) characteristic of the coordinated grant channel to the estimated characteristic of the coordinated grant or data channel to determine an error (e.g., a difference between the measured characteristic of the coordinated channel and the estimated characteristic of the coordinated channel); 2) determine, based on the error, a correction technique to be applied to the estimated characteristic of the coordinated channel (e.g., to correct and/or improve the accuracy of the estimated characteristic of the coordinated channel); and 3) correct the estimated characteristic of the coordinated channel based on the correction technique.

In an illustrative example, if the measured SINR of the coordinated channel is 20 dB higher than the estimated SINR for the coordinated channel, the error would be 20 dB. And, for example, the correction technique may be, in this simple example, to add 20 B to any estimated SINRs of the coordinated channel. Therefore, in this example, the accuracy of the estimated channel may be improved by applying the correction technique to the estimated SINR of the coordinated channel, e.g., 20 dB may be added to the estimated SINR to obtain an adjusted estimated SINR of the coordinated channel, for example. In this manner, the actual measured characteristic of the coordinated channel may be measured by the user device on occasion or periodically, e.g., when the user device is scheduled to receive data or signals over the coordinated data channel or coordinated grant channel, and then the actual measured characteristic of the coordinated channel may be used as feedback to adjust or correct one or more estimated characteristics of the coordinated channel for the user device. Therefore, the actual measured characteristic (e.g., signal strength or signal quality) of the coordinated channel may be used to improve the accuracy or performance of the estimate or estimated characteristic of the coordinated channel, e.g., in order to improve connection failure detection for a coordinated channel.

Several additional examples will now be provided. According to one illustrative example implementation: a user device (or UE) may monitor a downlink link (or connection, or communication session) quality based on the cell-specific reference signal (or common reference signals) received from one or more cells in order to detect the downlink radio link quality of a coordinated (or virtual) cell or coordinated (or virtual) channel. For example, the user device may estimate the downlink radio link quality of the coordinated (or virtual) channel or link and compare it (the estimated channel/link quality) to the thresholds Qout and Qin for the purpose of monitoring downlink radio link quality of the coordinated/virtual cell. The coordinated/virtual cell may include the one or more cells of the active set of cells, which may use a coordinated multi-cell communications technique to communicate with the user device. For example, the threshold Qout may be defined as the level at which the downlink radio link cannot be reliably received and may correspond to the block error rate (BLER) on a coordinated/virtual grant channel (e.g., coordinated/virtual PDCCH) when it includes scheduling grants for the user device, and when the active set of cells use a coordinated multi-cell communication technique to transmit the scheduling grant(s) to the user device. This may include, for example, a best grant channel/best PDCCH (transmitted from a best cell) out of the active set is used for scheduling grant transmission (e.g., for FCS), or for all cells (or all grant channels/PDCCHs of the active set of cells) to jointly/concurrently transmit the scheduling grant(s) to the user device (e.g., for either coherent or non-coherent JT). In an example implementation, the threshold Qin may be defined as the level at which the downlink radio link quality can be significantly more reliably received than at Qout and may, for example, correspond to 2% block error rate (BLER) of a hypothetical coordinated/virtual grant channel. Qout may, for example, correspond to a 10% BLER (as illustrative examples).

Therefore, according to an example implementation, it may (at least in some cases) be assumed that, when a user device is scheduled (e.g., schedule to receive downlink data), the grant channel (PDCCH), including the scheduling grant to the user device, may be transmitted (via all cells in the active set for JT, or via a best cell of the set of FCS) using the same coordinated multi-cell communication technique or scheme as used to transmit the data from the active set of cells to the user device. Thus, according to an example implementation, by using a same coordinated multi-cell communication technique to transmit the scheduling grant over the grant channel (e.g., PDCCH) as used to transmit the data over the data channel, this will provide the same signal/channel gains to the grant channel as provided via the data channel, e.g., such that scheduling grants will be received even in challenging radio conditions (created by e.g., mobility or movement of the user device, for example).

According to an example implementation, instead of defining a multi-cell communication session failure using individual grant channels (e.g., grant channels from individual cells), the failure may be determined based on a coordinated or virtual grant channel. For example, the coordinated or virtual grant channel may be the effective channel assuming a user specific combination of the individual grant channels, e.g., in accordance with the coordinated multi-cell communications technique used by the active set of cells or channels that are transmitting to the user device. The user device may determine a radio link (or connection) failure upon network configuration. For instance, the user device may determine a radio link (or connection) failure, using one or more of the techniques described herein, when the user device receives a notification of the coordinated multi-cell communication technique that is used, or when the user device is configured to operate. Alternatively, a new or specific indication may be sent from network to enable the user device to detect the communication session failure.

According to an illustrative example, a communication session failure may be detected based on the user device detecting signal quality (e.g., SINR) of reference signals from individual cell(s) of an active set, and then estimating, based on the SINRs of the individual cell signals, a block error rate (BLER) the block error rate (BLER) on a coordinated or virtual grant (e.g., PDCCH) channel, where the coordinated/virtual grant channel includes the signal gains from being transmitted using the coordinated multi-cell communication technique (e.g., either FCS or joint transmission, as examples). For example, if FCS is used as the coordinated multi-cell communication technique, then the user device may assume (e.g., in estimating the BLER of the coordinated grant channel) that the best cell of the active set will transmit the scheduling grant over the grant (e.g., PDCCH) channel. Similarly, for example, if joint transmission is used as the coordinated multi-cell communication technique, then the user device may assume (e.g., in estimating the BLER of the coordinated grant channel) that all cells of the active set are transmitting the scheduling grant over the grant channels. Some illustrative examples are described below.

According to this illustrative example, it is assumed that fast cell switching (FCS) is used as the coordinated multi-cell communication technique, e.g., to transmit data to the user via a coordinated data channel and to transmit scheduling grant(s) to the user via a coordinated grant channel. In this illustrative example: The active set contains cells 1, 2 and 3. It may be assumed that the sequence of the strongest/best cell is 1,1,1,2,2,1,1,3,3,3 (in 10 consecutive transmission time intervals (TTIs)). For example, the user device may measure or determine a best cell, e.g., based on channel quality indication (CQI), which may be received by the user device from one or more or all of the cells of the active set of cells, for example. For example, the SINR of cell x in TTI t may be denoted as: $SINR\_x(t)$. As a consequence of the above definition the user device may assume the following SINR sequence for failure detection: $SINR\_1(1)$, $SINR\_1(2)$, $SINR\_1(3)$, $SINR\_2(4)$, $SINR\_2(5)$, $SINR\_1(6)$, $SINR\_1(7)$, $SINR\_3(8)$, $SINR\_3(9)$, $SINR\_3(10)$. In the easiest case, the user device would may apply thresholds to this sequence of SINRs to determine failure, such as the Qout/Qin thresholds. For example, if the SINR is less than Qout, then the multi-cell communication session may be considered as failed, and the failed communication session may be terminated.

Alternatively, the user device may apply an averaging to the SINRs (e.g., average 5 most recent SINRs) before applying Qout/Qin thresholds.

Similarly, in another illustrative example, joint transmission (e.g., from all cells in the active set) may be used as a coordinated multi-cell transmission technique, and connection failure or radio link failure may be defined or determined using the estimated BLER of a coordinated/virtual grant channel, e.g., the coordinated grant channel when the grant channel includes scheduling grants for the user device transmitted from all cells/all individual grant channels of the active set.

Figure 4:
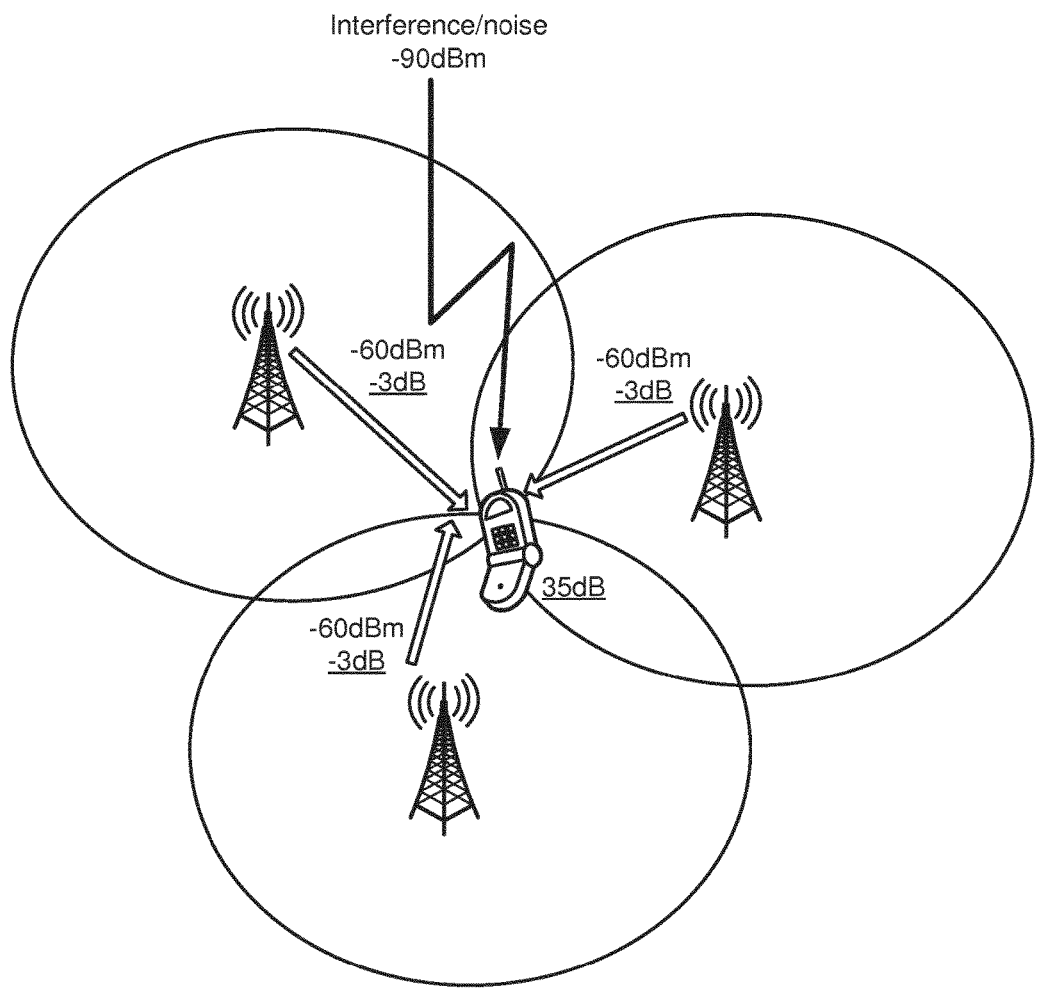
FIG. 4 is a diagram illustrating three cells transmitting to a user device/UE according to an example implementation.

FIG. 4 is a diagram illustrating three cells transmitting to a user device/UE according to an example implementation.

In this example, there may be 3 cells in the active set, and all cells are received by the user device at a strength of −60 dBm. This example illustrates how the use of a coordinated multi-cell transmission technique may improve signal quality/SINR of the grant channel/PDCCH as received by the user device, for example. Assume some background interference of −90 dBm. Each cell is received by user device/UE at a strength of −60 dBm. The SINR of the individual PDCCHs will be ~−3 dB (since every grant channel receives twice the −60 dBm signal from the other cells and without coordination this is interpreted as interference)

In a first example implementation with respect to FIG. 4, a single cell may be used to determine connection/link failure, and the coordinated multi-cell communications technique is not used to transmit the grant channel/PDCCH, and is not used for failure detection. In such case, in measuring the signal from a primary cell (one of the cells), the signal of that cell is −60 dBm, and the other cells are considered interference.

Signal: −60 dBm
Interference: db2I(−60 dBm)+db2I (−60 dBm)+db2I(−60 dBm)=−60 dBm+4.8 dB~−55 dBm, where db2I means that the indicated power level is translated from the logarithmic dBm domain to the linear power domain before summation.
SINR=−3 dB However, in another implementation of the system of FIG. 4, the coordinated multi-cell communication technique is used to transmit both data (via data channel) and scheduling grants (via grant channel/PDCCH) to the user device. However, data and scheduling grants cannot always be used to determine connection/link failure for the user device. So, an estimate of the BLER (or other signal characteristic) of the coordinated grant channel may be determined based on the SINRs of individual common reference signals from each cell of active set. For example, the SINRs or signal strengths of each individual cell (for joint transmission/SFN) may be added or summed together in power linear domain and then used to estimate a BLER for the coordinated grant channel, in order to more accurately perform connection/failure detection where the user device receives data/signals via a coordinated multi-cell communication technique.

Therefore, referring to FIG. 4, in the case where a coordinated multi-cell communication technique (e.g., joint transmission) is used to transmit data and scheduling grants, additional signal gains (e.g., signal gains due to use of coordinated multi-cell communication technique) may be received by the user device.

Signal: db2I(−60 dBm)+db2I (−60 dBm)+db2I(−60 dBm)~−55 dBm
Interference: −90 dBm
SINR=35 dB. Also, the SINR on the data channel is 35 dB. The interference in the active set, due to other cells in the set interfering, is saved/avoided, and a 5 dB SFN/coordinated multi-cell gain may be obtained instead. This example illustrates that there is an SINR difference of 38 dB between the individual PDCCHs and the use of a coordinated grant channel/PDCC, e.g., use of a coordinated multi-cell communication technique for the grant channel/PDCCH (including the SFN/JT signal gain).

Figure 5:
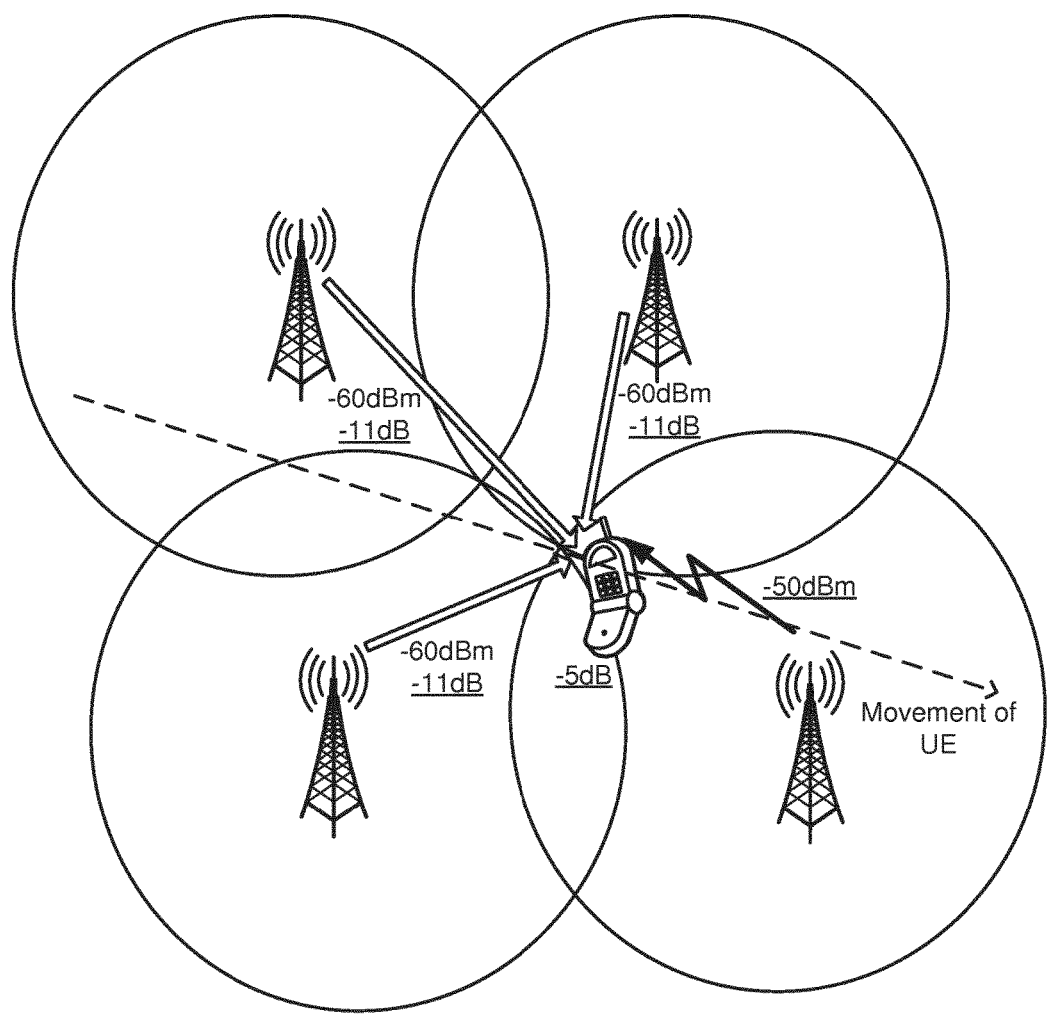
FIG. 5 is a diagram illustrating four cells and a user device/UE according to an example implementation.

FIG. 5 is a diagram illustrating four cells and a user device/UE according to an example implementation. In the example of FIG. 5, joint transmission is used by three of the four cells to transmit data (via coordinated data channel) and/or scheduling grants (via a coordinated grant/PDCCH channel) to the user device. In the example shown in FIG. 5, there is a 4th cell at −50 dBm, which cannot be added to the active set (e.g., the cell belongs to another base station hotel). Furthermore assume that the handover has not been carried out yet since the terminal is fast and/or there is massive shadowing fluctuation. In this example, the SINR on the individual PDCCHs/grant channels in the active set would be −11 dB (which most likely makes failure detection expire), whereas the SINR on the data channel is −5 dB. Also, the SINR on the coordinated/virtual grant (PDCCH) channel would be −5 dB as well.

Thus, with respect to FIG. 5, the quality on the cell-specific reference signals (i.e. can be measured directly even when the user device/UE is not scheduled):
Signal: −60 dBm
Interference: db2I(−60 dBm)+db2I (−60 dBm)+db2I(−50 dBm)~−49 dBm
SINR=−11 dB However, the SINR on a coordinated grant channel may be:
Signal: db2I(−60 dBm)+db2I (−60 dBm)+db2I(−60 dBm)~−55 dBm
Interference: −50 dBm
SINR=−5 dB The last example in FIG. 5 shows that failure detection may expire unnecessarily, i.e., the user device would be in service outage for the time that re-establishment takes (probably at least 50 ms). For the sake of completeness, there are also still cases where failure detection MUST expire if the SINR is −8 dB or below (if the size of the active set is small).

According to an example implementation, the user device/UE may be notified or may be aware that that the relevant grant channel receives a coordinated multi-cell (e.g., FSC/JT/SFN) gain from the cells in the active set when it is scheduled. When it is not scheduled, the user device can measure, for example: 1) Signal strength of all links; or 2) SINR of individual grant channels. Thus, the user device/UE still can approximate the SINR for the coordinated grant channel and thus predict/estimate the BLER of the coordinated grant channel that would lead to the detection of a failure, e.g., 10% BLER.

Thus, for example, two techniques are described as examples: Using the known signal strengths, it can easily approximate the SINR of −5 dB. A very coarse approximation is to measure the SINRs on the individual links and calculate a total SINR on the virtual/coordinated grant channel as the linear sum of the individual SINRs. In some cases, this approximation may not be very accurate, however it might be sufficient if the target/goal is to determine whether BLER is above 10% or not, which may be the threshold Qout to determine a failure. Some illustrative examples are provided, by way of example. However, the specific algorithm or technique used by a user device to estimate BLER or other characteristic of the coordinated channel based on individual cell signals may vary for different implementations and/or for different user devices. Also, the technique used for failure detection and/or definition of a failure may vary as a different coordinated multi-cell communication technique is used by the active set to transmit data or signals to the user device. So, the user device may be notified of the coordinated multi-cell communications technique that is used by the active set of cells for communication with the user device.

In addition, the user device may run a verification, i.e., it may compare: 1) the estimated SINR for the coordinated channel based on the individual SINRs of signals from each cell in the active set, e.g., when the UE was not scheduled, with 2) the actually measured SINR of the coordinated channel when the user device is scheduled or receiving the scheduling grant or data, for example. This comparison may be used to adapt a correction factor to the approximation/SINR estimate, e.g., to improve accuracy.

And, according to yet another example implementation, as an alternative to using the grant channel for failure detection, an extra downlink channel can be defined for failure detection. This extra downlink channel may send regular or periodic dedicated reference signals to each connected user device, even if they are not scheduled. The user device-specific (e.g., signals that are specific for each user device) dedicated reference signals may be transmitted using the same coordinated multi-cell communication technique as the data transmission (e.g. FCS, SFN, JT) and/or scheduling grant transmission. This may be designed similarly to the Sounding Reference Signals (SRS) used on the LTE uplink. The costs for such a reference signal would also be similar to SRS.

Figure 6:
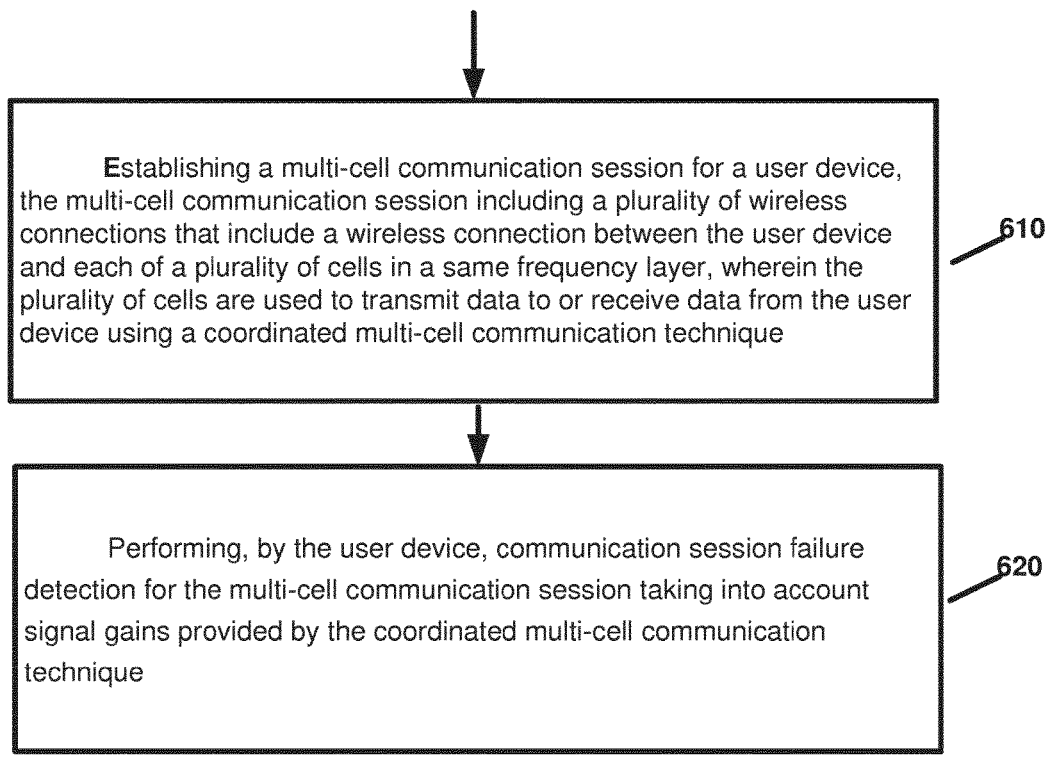
FIG. 6 is a flow chart illustrating operation of a user device according to an example implementation.

FIG. 6 is a flow chart illustrating operation of a user device according to an example implementation. Operation 610 includes establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and operation 620 includes performing, by the user device, communication session failure detection for the multi-cell communication session taking into account signal gains provided by the coordinated multi-cell communication technique.

According to an example implementation of the method of FIG. 6, the performing may include performing, by the user device, communication session failure detection by producing an estimate of a performance of the multi-cell communication session between the plurality of cells and the user device based on measurement of signals from individual cells of the plurality of cells.

According to an example implementation of the method of FIG. 6, the plurality of cells are also used to transmit scheduling grant information via a coordinated grant channel to the user device using the coordinated multi-cell communication technique.

According to an example implementation of the method of FIG. 6, the performing may include: measuring, by the user device, a characteristic of a common reference signal received from each of one or more of the plurality of cells; estimating, by the user device based on the measured characteristic of the common reference signals from one or more of the cells, a characteristic of the coordinated grant channel that includes signal gains based on the plurality of cells transmitting information over the coordinated grant channel using the coordinated multi-cell communication technique; and comparing the estimated characteristic of the coordinated grant channel to a threshold.

According to an example implementation of the method of FIG. 6, the measuring may include measuring, by the user device, a signal-to-interference-plus-noise ratio (SINR) of common reference signals received from one or more of the plurality of cells when scheduling grant information is not transmitted to the user device via the coordinated grant channel; and wherein the estimating may include estimating, by the user device based on the one or more measured SINRs of the common reference signals, a block error rate (BLER) of the coordinated grant channel that includes signal gains based on the plurality of cells transmitting information over the coordinated grant channel using the coordinated multi-cell communication technique.

According to an example implementation of the method of FIG. 6, the method further including: measuring, by the user device, one or more characteristics of signals received from the coordinated grant channel or a coordinated data channel that includes signal gains based on the plurality of cells transmitting information using the coordinated multi-cell communication technique to verify an accuracy of the estimated characteristic of the coordinated grant channel.

According to an example implementation of the method of FIG. 6, the method may further include: comparing, by the user device, the one or more measured characteristics of signals received from the coordinated grant channel or the coordinated data channel to the estimated characteristic of the coordinated grant channel to determine an error; determining, by the user device based on the error, a correction technique to correct the estimated characteristic of the coordinated grant channel; and correcting the estimated characteristic of the coordinated grant channel based on the correction technique.

According to an example implementation of the method of FIG. 6, the measured characteristic may include one or more of the following: a signal quality; a signal-to-interference-plus-noise ratio (SINR); a signal strength or power; an error rate; and a block error rate (BLER).

According to an example implementation of the method of FIG. 6, the method may further include: receiving, by the user device, an indication of the coordinated multi-cell communication technique.

According to an example implementation of the method of FIG. 6, the coordinated multi-cell communication technique may include at least one of: a fast cell selection (FCS) communication technique; a non-coherent joint transmission communication technique; and a coherent joint transmission communication technique.

According to an example implementation of the method of FIG. 6, wherein the plurality of cells are also used to transmit a user device-specific coordinated multi-cell reference signal using the coordinated multi-cell communication technique, wherein the performing includes: measuring, by the user device, one or more characteristics of the user device-specific coordinated multi-cell reference signal received from one or more of the plurality of cells; and performing, by the user device, communication session failure detection based on the one or more measured characteristics of the user device-specific coordinated multi-cell reference signal from one or more of the plurality of cells that were transmitted using the coordinated multi-cell communication technique.

According to an example implementation of the method of FIG. 6, wherein the coordinated grant channel includes a coordinated physical downlink control channel (PDCCH) via which grant information is transmitted to the user device using the coordinated multi-cell communication technique.

According to an example implementation, an apparatus may include at least one processor and at least one memory including computer instructions, when executed by the at least one processor, cause the apparatus to: establish a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and perform, by the user device, communication session failure detection for the multi-cell communication session taking into account signal gains provided by the coordinated multi-cell communication technique.

According to an example implementation of the apparatus, wherein causing the apparatus to perform comprises causing the apparatus to perform, by the user device, communication session failure detection by producing an estimate of a performance of the multi-cell communication session between the plurality of cells and the user device based on measurement of signals from individual cells of the plurality of cells.

According to an example implementation of the apparatus, wherein the plurality of cells are also used to transmit scheduling grant information via a coordinated grant channel to the user device using the coordinated multi-cell communication technique.

According to an example implementation of the apparatus, wherein causing the apparatus to perform includes causing the apparatus to: measure, by the user device, a characteristic of a common reference signal received from each of one or more of the plurality of cells; estimate, by the user device based on the measured characteristic of the common reference signals from one or more of the cells, a characteristic of the coordinated grant channel that includes signal gains based on the plurality of cells transmitting information over the coordinated grant channel using the coordinated multi-cell communication technique; and compare the estimated characteristic of the coordinated grant channel to a threshold.

According to an example implementation of the apparatus, wherein causing the apparatus to measure includes causing the apparatus to measure, by the user device, a signal-to-interference-plus-noise ratio (SINR) of common reference signals received from one or more of the plurality of cells when scheduling grant information is not transmitted to the user device via the coordinated grant channel; and wherein causing the apparatus to estimate includes causing the apparatus to estimate, by the user device based on the one or more measured SINRs of the common reference signals, a block error rate (BLER) of the coordinated grant channel that includes signal gains based on the plurality of cells transmitting information over the coordinated grant channel using the coordinated multi-cell communication technique.

According to an example implementation of the apparatus, the apparatus further caused to measure, by the user device, one or more characteristics of signals received from the coordinated grant channel or a coordinated data channel that includes signal gains based on the plurality of cells transmitting information using the coordinated multi-cell communication technique to verify an accuracy of the estimated characteristic of the coordinated grant channel.

According to an example implementation of the apparatus, and further comprising: causing the apparatus to compare, by the user device, the one or more measured characteristics of signals received from the coordinated grant channel or the coordinated data channel to the estimated characteristic of the coordinated grant channel to determine an error; causing the apparatus to determine, by the user device based on the error, a correction technique to correct the estimated characteristic of the coordinated grant channel; and causing the apparatus to correct the estimated characteristic of the coordinated grant channel based on the correction technique.

According to an example implementation of the apparatus, wherein the plurality of cells are also used to transmit a user device-specific coordinated multi-cell reference signal using the coordinated multi-cell communication technique, wherein the causing the apparatus to perform includes: causing the apparatus to measure, by the user device, one or more characteristics of the user device-specific coordinated multi-cell reference signal received from one or more of the plurality of cells; and causing the apparatus to perform, by the user device, communication session failure detection based on the one or more measured characteristics of the user device-specific coordinated multi-cell reference signal from one or more of the plurality of cells that were transmitted using the coordinated multi-cell communication technique.

According to an example implementation, a computer program product includes a non-transitory computer-readable storage medium and storing executable code that, when executed by at least one data processing apparatus, is configured to cause the at least one data processing apparatus to perform a method including: establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and performing, by the user device, communication session failure detection for the multi-cell communication session taking into account signal gains provided by the coordinated multi-cell communication technique.

According to another example implementation, an apparatus may include means (802A/802B and/or 804) for establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and means (802A/802B and/or 804) for performing, by the user device, communication session failure detection for the multi-cell communication session taking into account signal gains provided by the coordinated multi-cell communication technique.

According to an example implementation of the apparatus, the means for means for performing may include means (802A/802B and/or 804) for performing, by the user device, communication session failure detection by producing an estimate of a performance of the multi-cell communication session between the plurality of cells and the user device based on measurement of signals from individual cells of the plurality of cells.

According to an example implementation of the apparatus, the plurality of cells are also used to transmit scheduling grant information via a coordinated grant channel to the user device using the coordinated multi-cell communication technique.

According to an example implementation of the apparatus, the means for performing may include: means for (802A/802B and/or 804) measuring, by the user device, a characteristic of a common reference signal received from each of one or more of the plurality of cells; means (802A/802B and/or 804) for estimating, by the user device based on the measured characteristic of the common reference signals from one or more of the cells, a characteristic of the coordinated grant channel that includes signal gains based on the plurality of cells transmitting information over the coordinated grant channel using the coordinated multi-cell communication technique; and comparing the estimated characteristic of the coordinated grant channel to a threshold.

According to an example implementation of the apparatus, the means for measuring may include means (802A/802B and/or 804) for measuring, by the user device, a signal-to-interference-plus-noise ratio (SINR) of common reference signals received from one or more of the plurality of cells when scheduling grant information is not transmitted to the user device via the coordinated grant channel; and wherein the means for estimating may include means (802A/802B and/or 804) for estimating, by the user device based on the one or more measured SINRs of the common reference signals, a block error rate (BLER) of the coordinated grant channel that includes signal gains based on the plurality of cells transmitting information over the coordinated grant channel using the coordinated multi-cell communication technique.

According to an example implementation of the apparatus, the apparatus may further include: means (802A/802B and/or 804) for measuring, by the user device, one or more characteristics of signals received from the coordinated grant channel or a coordinated data channel that includes signal gains based on the plurality of cells transmitting information using the coordinated multi-cell communication technique to verify an accuracy of the estimated characteristic of the coordinated grant channel.

According to an example implementation of the apparatus, the apparatus may further include: means (802A/802B and/or 804) for comparing, by the user device, the one or more measured characteristics of signals received from the coordinated grant channel or the coordinated data channel to the estimated characteristic of the coordinated grant channel to determine an error; means (802A/802B and/or 804) for determining, by the user device based on the error, a correction technique to correct the estimated characteristic of the coordinated grant channel; and means for correcting the estimated characteristic of the coordinated grant channel based on the correction technique.

According to an example implementation of the apparatus, the measured characteristic may include one or more of the following: a signal quality; a signal-to-interference-plus-noise ratio (SINR); a signal strength or power; an error rate; and a block error rate (BLER).

According to an example implementation of the apparatus, the apparatus may further include: means (802A/802B and/or 804) for receiving, by the user device, an indication of the coordinated multi-cell communication technique.

According to an example implementation of the apparatus, the coordinated multi-cell communication technique may include at least one of: a fast cell selection (FCS) communication technique; a non-coherent joint transmission communication technique; and a coherent joint transmission communication technique.

According to an example implementation of the apparatus, wherein the plurality of cells are also used to transmit a user device-specific coordinated multi-cell reference signal using the coordinated multi-cell communication technique, wherein the means for performing includes: means (802A/802B and/or 804) for measuring, by the user device, one or more characteristics of the user device-specific coordinated multi-cell reference signal received from one or more of the plurality of cells; and means (802A/802B and/or 804) for performing, by the user device, communication session failure detection based on the one or more measured characteristics of the user device-specific coordinated multi-cell reference signal from one or more of the plurality of cells that were transmitted using the coordinated multi-cell communication technique.

According to an example implementation of the apparatus, wherein the coordinated grant channel includes a coordinated physical downlink control channel (PDCCH) via which grant information is transmitted to the user device using the coordinated multi-cell communication technique.

Figure 7:
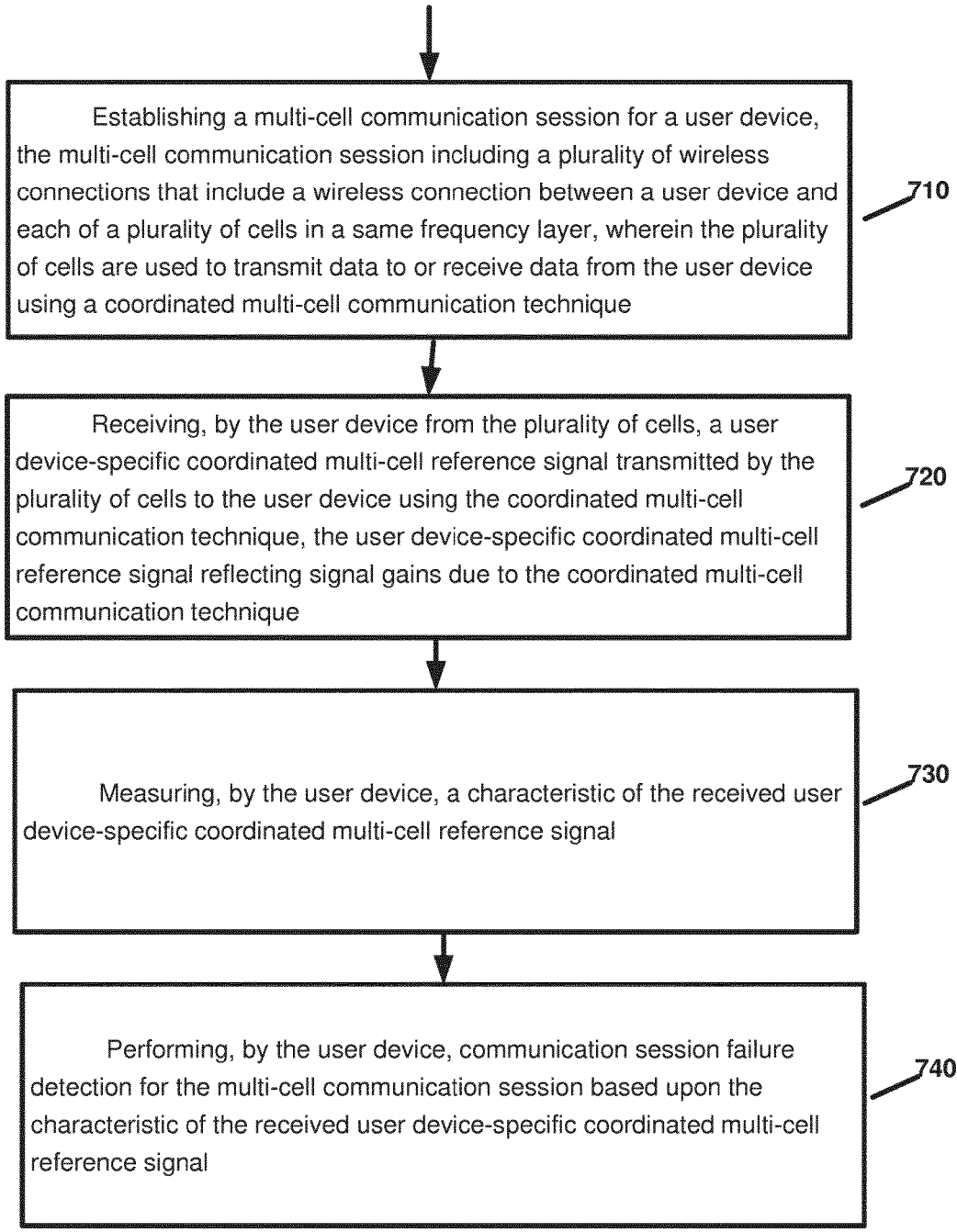
FIG. 7 is a flow chart illustrating operation of a user device according to another example implementation.

FIG. 7 is a flow chart illustrating operation of a user device according to another example implementation. Operation 710 may include establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; operation 720 may include receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; operation 730 may include measuring, by the user device, a characteristic of the received user device-specific coordinated multi-cell reference signal; and operation 740 may include performing, by the user device, communication session failure detection for the multi-cell communication session based upon the characteristic of the received user device-specific coordinated multi-cell reference signal.

According to an example implementation of the method illustrated in the flow chart of FIG. 7, the receiving may include: receiving, by the user device from the plurality of cells during a time when the user device is not receiving a scheduling grant or data from the plurality of cells, a user device-specific coordinated multi-cell reference signal transmitted by the plurality of cells to the user device using the coordinated multi-cell communication technique.

According to another example implementation, an apparatus may include means (802A/802B and/or 804) for establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; means (802A/802B and/or 804) for receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; means (802A/802B and/or 804) for measuring, by the user device, a characteristic of the received user device-specific coordinated multi-cell reference signal; and means (802A/802B and/or 804) for performing, by the user device, communication session failure detection for the multi-cell communication session based upon the characteristic of the received user device-specific coordinated multi-cell reference signal.

According to an example implementation of the apparatus, the means for receiving may include: means (802A/802B and/or 804) for receiving, by the user device from the plurality of cells during a time when the user device is not receiving a scheduling grant or data from the plurality of cells, a user device-specific coordinated multi-cell reference signal transmitted by the plurality of cells to the user device using the coordinated multi-cell communication technique.

According to another example implementation, an apparatus may include at least one processor and at least one memory including computer instructions, when executed by the at least one processor, cause the apparatus to: establish a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; receive, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; measure, by the user device, a characteristic of the received user device-specific coordinated multi-cell reference signal; and perform, by the user device, communication session failure detection for the multi-cell communication session based upon the characteristic of the received user device-specific coordinated multi-cell reference signal.

According to another example implementation, a computer program product may include a non-transitory computer-readable storage medium and storing executable code that, when executed by at least one data processing apparatus, is configured to cause the at least one data processing apparatus to perform a method including: establishing a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique; receiving, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; measuring, by the user device, a characteristic of the received user device-specific coordinated multi-cell reference signal; and performing, by the user device, communication session failure detection for the multi-cell communication session based upon the characteristic of the received user device-specific coordinated multi-cell reference signal.

Figure 8:
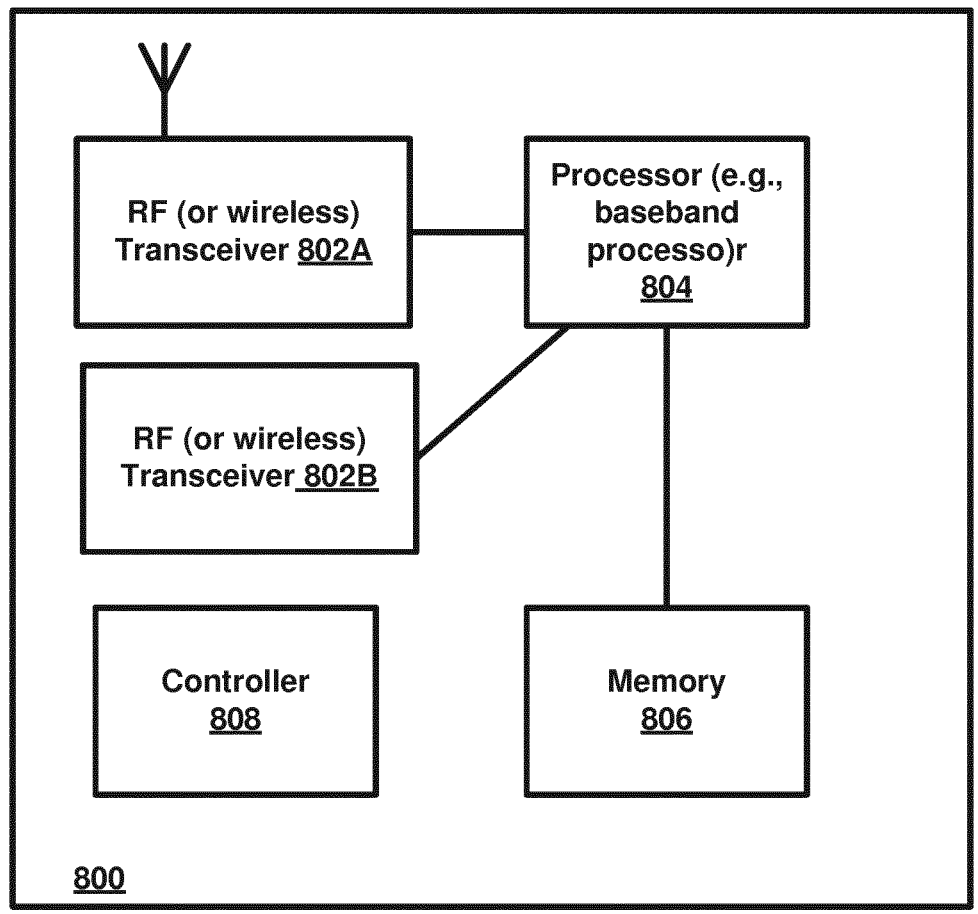
FIG. 8 is a block diagram of a network node (e.g., BS or user device) according to an example implementation.

FIG. 8 is a block diagram of a network node (e.g., BS or user device) 800 according to an example implementation. The network node (or wireless station) 800 may include, for example, two RF (radio frequency) or wireless transceivers 802A, 802B, where each wireless transceiver includes a transmitter to transmit signals and a receiver to receive signals. The wireless station also includes a processor 804 to execute instructions or software and control transmission and receptions of signals, and a memory 806 to store data and/or instructions.

Processor 804 may also make decisions or determinations, generate frames, packets or messages for transmission, decode received frames or messages for further processing, and other tasks or functions described herein. Processor 804, which may be a baseband processor, for example, may generate messages, packets, frames or other signals for transmission via wireless transceiver 802. Processor 804 may control transmission of signals or messages over a wireless network, and may receive signals or messages, etc., via a wireless network (e.g., after being down-converted by wireless transceiver 802, for example). Processor 804 may be programmable and capable of executing software or other instructions stored in memory or on other computer media to perform the various tasks and functions described above, such as one or more of the tasks or methods described above. Processor 804 may be (or may include), for example, hardware, programmable logic, a programmable processor that executes software or firmware, and/or any combination of these. Using other terminology, processor 804 and transceiver 802 together may be considered as a wireless transmitter/receiver system, for example.

In addition, referring to FIG. 8, a controller (or processor) 808 may execute software and instructions, and may provide overall control for the network node 800, and may provide control for other systems not shown in FIG. 8, such as controlling input/output devices (e.g., display, keypad), and/or may execute software for one or more applications that may be provided on network node 800, such as, for example, an email program, audio/video applications, a word processor, a Voice over IP application, or other application or software.

In addition, a storage medium may be provided that includes stored instructions, which when executed by a controller or processor may result in the processor 804, or other controller or processor, performing one or more of the functions or tasks described above.

The embodiments are not, however, restricted to the system that is given as an example, but a person skilled in the art may apply the solution to other communication systems. Another example of a suitable communications system is the 5G concept. It is assumed that network architecture in 5G will be quite similar to that of the LTE-advanced. 5G is likely to use multiple input-multiple output (MIMO) antennas, many more base stations or nodes than the LTE (a so-called small cell concept), including macro sites operating in co-operation with smaller stations and perhaps also employing a variety of radio technologies for better coverage and enhanced data rates.

It should be appreciated that future networks will most probably utilise network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or data storage may also be utilized. In radio communications this may mean node operations may be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, a data processing apparatus, e.g., a programmable processor, a computer, or multiple computers. Implementations may also be provided on a computer readable medium or computer readable storage medium, which may be a non-transitory medium.

Implementations of the various techniques may also include implementations provided via transitory signals or media, and/or programs and/or software implementations that are downloadable via the Internet or other network(s), either wired networks and/or wireless networks. In addition, implementations may be provided via machine type communications (MTC), and also via an Internet of Things (IOT).

The computer program may be in source code form, object code form, or in some intermediate form, and it may be stored in some sort of carrier, distribution medium, or computer readable medium, which may be any entity or device capable of carrying the program. Such carriers include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers.

Furthermore, implementations of the various techniques described herein may use a cyber-physical system (CPS) (a system of collaborating computational elements controlling physical entities). CPS may enable the implementation and exploitation of massive amounts of interconnected ICT devices (sensors, actuators, processors microcontrollers, . . . ) embedded in physical objects at different locations. Mobile cyber physical systems, in which the physical system in question has inherent mobility, are a subcategory of cyber-physical systems. Examples of mobile physical systems include mobile robotics and electronics transported by humans or animals. The rise in popularity of smartphones has increased interest in the area of mobile cyber-physical systems. Therefore, various implementations of techniques described herein may be provided via one or more of these technologies.

A computer program, such as the computer program(s) described above, can be written in any form of programming language, including compiled or interpreted languages, and can be deployed in any form, including as a stand-alone program or as a module, component, subroutine, or other unit or part of it suitable for use in a computing environment. A computer program can be deployed to be executed on one computer or on multiple computers at one site or distributed across multiple sites and interconnected by a communication network.

Method steps may be performed by one or more programmable processors executing a computer program or computer program portions to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer, chip or chipset. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a user, implementations may be implemented on a computer having a display device, e.g., a cathode ray tube (CRT) or liquid crystal display (LCD) monitor, for displaying information to the user and a user interface, such as a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
    establishing a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and
    performing, by the user device, communication session failure detection for the multi-cell communication session based on coordinated signal gains provided by the coordinated multi-cell communication technique.

2. The method of claim 1 wherein the performing comprises performing, by the user device, communication session failure detection by producing an estimate of a performance of the multi-cell communication session between the plurality of cells and the user device based on measurement of signals from individual cells of the plurality of cells.

3. The method of claim 1 wherein the plurality of cells are also used to transmit scheduling grant information via a coordinated grant channel to the user device using the coordinated multi-cell communication technique.

4. The method of claim 3 wherein the performing comprises:
measuring, by the user device, a characteristic of a common reference signal received from each of one or more of the plurality of cells;
estimating, by the user device based on the measured characteristic of the common reference signals from one or more of the cells, a characteristic of the coordinated grant channel that includes signal gains based on the plurality of cells transmitting information over the coordinated grant channel using the coordinated multi-cell communication technique; and
comparing the estimated characteristic of the coordinated grant channel to a threshold.

5. The method of claim 4:
wherein the measuring comprises measuring, by the user device, a signal-to-interference-plus-noise ratio (SINR) of common reference signals received from one or more of the plurality of cells when scheduling grant information is not transmitted to the user device via the coordinated grant channel; and
wherein the estimating comprises estimating, by the user device based on the one or more measured SINRs of the common reference signals, a block error rate (BLER) of the coordinated grant channel that includes signal gains based on the plurality of cells transmitting information over the coordinated grant channel using the coordinated multi-cell communication technique.

6. The method of claim 4 and further comprising:
measuring, by the user device, one or more characteristics of signals received from the coordinated grant channel or a coordinated data channel that includes signal gains based on the plurality of cells transmitting information using the coordinated multi-cell communication technique to verify an accuracy of the estimated characteristic of the coordinated grant channel.

7. The method of claim 6 and further comprising:
comparing, by the user device, the one or more measured characteristics of signals received from the coordinated grant channel or the coordinated data channel to the estimated characteristic of the coordinated grant channel to determine an error;
determining, by the user device based on the error, a correction technique to correct the estimated characteristic of the coordinated grant channel; and
correcting the estimated characteristic of the coordinated grant channel based on the correction technique.

8. The method of claim 1 and further comprising:
receiving, by the user device, an indication of the coordinated multi-cell communication technique.

9. The method of claim 1 wherein the plurality of cells are also used to transmit a user device-specific coordinated multi-cell reference signal using the coordinated multi-cell communication technique, wherein the performing comprises:
measuring, by the user device, one or more characteristics of the user device-specific coordinated multi-cell reference signal received from one or more of the plurality of cells;
performing, by the user device, communication session failure detection based on the one or more measured characteristics of the user device-specific coordinated multi-cell reference signal from one or more of the plurality of cells that were transmitted using the coordinated multi-cell communication technique.

10. The method of claim 2 wherein the coordinated grant channel comprises a coordinated physical downlink control channel (PDCCH) via which grant information is transmitted to the user device using the coordinated multi-cell communication technique.

11. A computer program product, the computer program product comprising a non-transitory computer-readable storage medium and storing executable code that, when executed by at least one data processing apparatus, is configured to cause the at least one data processing apparatus to perform the method of claim 1.

12. An apparatus comprising at least one processor and at least one memory including computer instructions, when executed by the at least one processor, cause the apparatus to:
establish a multi-cell communication session for a user device, the multi-cell communication session including a plurality of wireless connections that include a wireless connection between the user device and each of a plurality of cells in a same frequency layer, wherein the plurality of cells are used to transmit data to or receive data from the user device using a coordinated multi-cell communication technique; and
perform, by the user device, communication session failure detection for the multi-cell communication session based on coordinated signal gains provided by the coordinated multi-cell communication technique.

13. The apparatus of claim 12 wherein causing the apparatus to perform comprises causing the apparatus to perform, by the user device, communication session failure detection by producing an estimate of a performance of the multi-cell communication session between the plurality of cells and the user device based on measurement of signals from individual cells of the plurality of cells.

14. The apparatus of claim 12 wherein the plurality of cells are also used to transmit scheduling grant information via a coordinated grant channel to the user device using the coordinated multi-cell communication technique.

15. The apparatus of claim 14 wherein causing the apparatus to perform comprises causing the apparatus to:
measure, by the user device, a characteristic of a common reference signal received from each of one or more of the plurality of cells;
estimate, by the user device based on the measured characteristic of the common reference signals from one or more of the cells, a characteristic of the coordinated grant channel that includes signal gains based on the plurality of cells transmitting information over the coordinated grant channel using the coordinated multi-cell communication technique; and
compare the estimated characteristic of the coordinated grant channel to a threshold.

16. The apparatus of claim 15:
wherein causing the apparatus to measure comprises causing the apparatus to measure, by the user device, a signal-to-interference-plus-noise ratio (SINK) of common reference signals received from one or more of the plurality of cells when scheduling grant information is not transmitted to the user device via the coordinated grant channel; and
wherein causing the apparatus to estimate comprises causing the apparatus to estimate, by the user device based on the one or more measured SINRs of the common reference signals, a block error rate (BLER) of the coordinated grant channel that includes signal gains based on the plurality of cells transmitting information over the coordinated grant channel using the coordinated multi-cell communication technique.

17. The apparatus of claim 15 and further comprising:
causing the apparatus to measure, by the user device, one or more characteristics of signals received from the coordinated grant channel or a coordinated data channel that includes signal gains based on the plurality of cells transmitting information using the coordinated multi-cell communication technique to verify an accuracy of the estimated characteristic of the coordinated grant channel.

18. The apparatus of claim 17 and further comprising:
causing the apparatus to compare, by the user device, the one or more measured characteristics of signals received from the coordinated grant channel or the coordinated data channel to the estimated characteristic of the coordinated grant channel to determine an error;
causing the apparatus to determine, by the user device based on the error, a correction technique to correct the estimated characteristic of the coordinated grant channel; and
causing the apparatus to correct the estimated characteristic of the coordinated grant channel based on the correction technique.

19. The apparatus of claim 12 and further comprising:
causing the apparatus to receive, by the user device, an indication of the coordinated multi-cell communication technique.

20. The apparatus of claim 12 wherein the plurality of cells are also used to transmit a user device-specific coordinated multi-cell reference signal using the coordinated multi-cell communication technique, wherein the causing the apparatus to perform comprises:
causing the apparatus to measure, by the user device, one or more characteristics of the user device-specific coordinated multi-cell reference signal received from one or more of the plurality of cells; and
causing the apparatus to perform, by the user device, communication session failure detection based on the one or more measured characteristics of the user device-specific coordinated multi-cell reference signal from one or more of the plurality of cells that were transmitted using the coordinated multi-cell communication technique.

21. An apparatus comprising at least one processor and at least one memory including computer instructions, when executed by the at least one processor, cause the apparatus to:
establish a multi-cell communication session for a user device, the multi-cell communication session including a plurality of wireless connections that include a wireless connection between a user device and each of a plurality of cells in a same frequency layer, wherein the plurality of cells are used to transmit data to or receive data from the user device using a coordinated multi-cell communication technique;
receive, by the user device from the plurality of cells, a user device-specific coordinated multi-cell reference signal transmitted by the plurality of cells to the user device using the coordinated multi-cell communication technique, the user device-specific coordinated multi-cell reference signal reflecting signal gains due to the coordinated multi-cell communication technique; and
measure, by the user device, a characteristic of the received user device-specific coordinated multi-cell reference signal; and
perform, by the user device, communication session failure detection for the multi-cell communication session based upon the characteristic of the received user device-specific coordinated multi-cell reference signal.

* * * * *